United States Patent [19]
Aoyama et al.

[11] Patent Number: 5,848,329
[45] Date of Patent: Dec. 8, 1998

[54] IMAGE FORMING APPARATUS HAVING A MOUNTING/DISMOUNTING MECHANISM

[75] Inventors: Yuichi Aoyama, Tokyo; Makoto Obu, Yokohama; Masaki Hiroi, Sendai; Katsuaki Miyawaki, Yokohama; Nobuhiko Umezawa, Yokohama; Masami Hiramatsu, Yokohama, all of Japan

[73] Assignee: Ricoh Company, Ltd., Tokyo, Japan

[21] Appl. No.: 832,364

[22] Filed: Apr. 2, 1997

[30] Foreign Application Priority Data

| Apr. 3, 1996 | [JP] | Japan | 8-108489 |
| Apr. 10, 1996 | [JP] | Japan | 8-087791 |
| May 30, 1996 | [JP] | Japan | 8-136453 |
| Jul. 10, 1996 | [JP] | Japan | 8-199618 |
| Mar. 5, 1997 | [JP] | Japan | 9-069148 |

[51] Int. Cl.$^6$ ............................ G03G 15/00; G03G 15/01
[52] U.S. Cl. ........................................ 399/113; 399/111
[58] Field of Search ..................... 399/110, 111, 399/112, 299, 113; 347/138, 152

[56] References Cited

U.S. PATENT DOCUMENTS

| 5,014,094 | 5/1991 | Amitani et al. ............. 399/12 |
| 5,051,760 | 9/1991 | Shoji et al. . | |
| 5,208,612 | 5/1993 | Obu et al. . | |
| 5,300,952 | 4/1994 | Wada et al. . | |
| 5,493,365 | 2/1996 | Matsui et al. . | |
| 5,504,590 | 4/1996 | Kawada et al. . | |
| 5,552,857 | 9/1996 | Ishikawa .................. 399/113 |
| 5,610,725 | 3/1997 | Kawada et al. . | |

FOREIGN PATENT DOCUMENTS 63-43173  2/1988  Japan.

*Primary Examiner*—Matthew S. Smith
*Assistant Examiner*—Sophia S. Chen
*Attorney, Agent, or Firm*—Oblon, Spivak, McClelland, Maier & Neustadt, P.C.

[57] ABSTRACT

An image forming apparatus including a plurality of image forming units or process units is disclosed. The process units may each be moved into and out of the body of the apparatus by hand. A plurality of support members for supporting the ends of the process units to be operated by hand extend substantially parallel to a linear path for conveying a recording medium, but outside of paths for moving the process units into and out of the apparatus body. A positioning mechanism positions the above end of the individual process unit relative to the support members. The positioning mechanism is implemented by holes formed in the support members, and pins studded on a positioning wall included in the individual process unit. The apparatus allows the process units to be positioned thereon accurately with a high mechanical strength, while allowing them to be mounted and dismounted with ease.

13 Claims, 33 Drawing Sheets

IMAGE FORMING APPARATUS HAVING A MOUNTING/DISMOUNTING MECHANISM

BACKGROUND OF THE INVENTION

The present invention relates to a copier, facsimile apparatus, printer or similar image forming apparatus and, more particularly, to an image forming apparatus including units or members removable for inspection or maintenance.

An image forming apparatus having an image forming unit or process unit removably mounted thereon is conventional (Prior Art 1 hereinafter). The process unit includes an image carrier, charger and so forth. For example, a plurality of process units may be removably mounted on the apparatus body and arranged linearly. In this case, a transfer belt or similar conveying means faces image carriers each included in the respective process unit. The transfer belt conveys a sheet or similar recording medium linearly by way of image transfer positions respectively assigned to the process units. Particularly, this kind of apparatus has been proposed in various forms as a multicolor or full-color image forming apparatus.

An image forming apparatus with a photoconductive drum or similar image carrier removably mounted thereon is also conventional (Prior Art 2 hereinafter). The problem with this type of apparatus is that any error in the position of the image carrier on the apparatus body effects image formation. Particularly, in a tandem color image forming apparatus having a plurality of image carriers, the above error directly translates into an error between the positions of the image carriers, resulting in the misregister of colors.

Japanese Patent Laid-Open Publication No. 62-254159 discloses a color image forming apparatus including an implementation for locating the image carrier at a preselected position, and also belonging to Prior Art 2. The implementation includes a shaft support member affixed to the inner surface of a rear frame forming part of th e apparatus body. A drum shaft is rotatably supported by the shaft support member and directly connected to the output shaft of a motor located outside of the rear frame. An image carrier in the form of a photoconductive drum is rotatably mounted on a box-like frame which can be pulled out in parallel to the drum shaft. In this configuration, the drum shaft is rotated by the motor, and in turn rotates the drum integrally therewith. At the time of maintenance, the box-like frame is pulled out forward.

A copier, printer, facsimile apparatus or similar electrophotographic apparatus capable of forming not only a two or more colors is also available (Prior Art 3 hereinafter). To form a color image, a plurality of photoconductive elements or image carriers are used, and each is assigned to a particular color resulting from the color separation of a document image. A latent image is electrostatically formed on any one of the photoconductive elements in accordance with color-by-color image data the latent image is developed by a developer of complementary color, turning out a corresponding toner image. The toner image is transferred from the photoconductive element to a plain paper or similar sheet. Such a procedure is repeated to sequentially transfer toner images of different colors from the photoconductive elements to the sheet one above the other, completing a color image. Alternatively, toner images of different colors may be sequentially transferred from the photoconductive elements to a transfer belt, and then transferred from the belt to the sheet collectively.

The apparatus belonging to Prior Art 3 sometimes includes image forming units each assigned to a particular color. Each image forming unit has a photoconductive element, charger, developing device, image transfer device and cleaning device assembled together. The developing device may store a developing liquid so as to develop the latent image by electrophoresis, as well known in the art. Image forming unit can be pulled out of the apparatus body for replenishing the developing liquid or for replacing or otherwise dealing with, e.g., the photoconductive element.

Maintenance work or inspection work includes releasing the cleaning device from the photoconductive element. An arrangement for moving the cleaning device into and out of contact with the photoconductive element will be described later in detail. The above work also includes replacing the photoconductive element. Usually, a drive shaft carrying the photoconductive element thereon is supported at its end by the side wall of a casing included in the image forming unit. This kind of support structure will also be described specifically later.

An image forming unit having all or part of an image carrier, charger, developing section, image transfer section, cleaning section and discharger assembled together is also known in the art (Prior Art 4). The image forming unit is capable of being pulled out of or inserted into the apparatus body. Specifically, the image forming unit is mounted on slide guides, carriages or similar rail-like members which can be pulled out of the apparatus body. Alternatively, the image forming unit may be provided with ridges or recesses capable of mating with recesses or ridges formed on the apparatus body.

The rail scheme is used when the image forming unit is relatively heavy while the ridge and recess scheme is used when the unit is relatively light and low cost. In any case, the image carrier is mounted to the frame (side wall) of the image forming unit, and cannot be easily separated from the unit although the unit may be pulled out of the apparatus body.

Generally, it is desirable to reduce the trouble-shooting time and maintenance time. This is particularly true with an electrophotographic printer operable at a high printing speed. Because most of sudden troubles must be dealt with immediately, it is most preferable to replace the entire image forming unit. Therefore, the section or the part to be dealt with should preferably be uncovered, as needed. Especially, when the image forming unit is mounted on the rail-like slide guides, it is desirable that the unit pulled out of the apparatus body be held on the slide guides during, e.g., maintenance, and that the unit be readily removable from a slide guide base so as to be replaced with another unit.

Assume that the image carrier is accommodated in the image forming unit while the image forming unit is deal with while remaining on the slide guides. Then, it is difficult for the operator to see the conditions of or clean a developing roller, cleaning blade and so forth of the developing section. An image forming device taught in Japanese Patent Laid-Open Publication No. 59-165073, for example, allows the image carrier to be removed from the image forming unit pulled out from the apparatus body, but held on the slide guides. Specifically, this apparatus includes a U-shaped member disposed in the image forming unit. Bearings are respectively mounted on shaft portions protruding from both ends of the image carrier implemented as a drum. The U-shaped member sustains the bearings in such a manner as to raise them, as needed.

Prior Art 1 through Prior Art 4 discussed above have some problems yet to be solved, as follows.

In Prior Art 1, the linear layout of the image forming units is severely limited as to the way of supporting them on the apparatus body. It has been customary with Prior Art 1 to arrange a system for driving the image forming units at the rear of the apparatus body, and to allow the operator to mount or dismount the units at the front of the apparatus body. For this reason, the front wall of the apparatus body is, in many cases, formed with large openings for receiving the image forming units. Therefore, means for supporting each image forming unit on the apparatus body and means for positioning it are located at positions remote from the center of the image forming unit or on a relatively weak wall intervening between nearby units (see, e.g., Japanese Patent Laid-Open Publication No. 59-62879 or Japanese Patent Utility Model Laid-Open Publication No. 63-29148). This not only brings about misregister of colors due to the low positioning accuracy of the image forming units, but also causes jitter to occur due to the insufficient support strength. Particularly, when the above means are affixed to a wall intervening between nearby image forming units, as in the above Laid-Open Publication No. 63-29148, an extra affixing space is necessary which would increase the pitch of the image forming units and would thereby obstruct the miniaturization of the apparatus.

To solve the above problems, all the image forming units may be integrally supported by the apparatus body, as proposed in, e.g., Japanese Patent Laid-Open Publication No. 62-299977 or Japanese Utility Model Laid-Open Publication No. 63-185151. This, however, gives rise to another problem that when one of the image forming units is dismounted from the apparatus body, it entrains the other image forming units. Moreover, because the image forming units other than one being mounted or dismounted are not supported at all, they positional accuracy is apt to fall.

In Prior Art 2, when the drum is pulled out of the apparatus body together with the frame, the drum shaft remains on the rear wall or frame of the apparatus body. Although the drum shaft is supported by the shaft support member over a certain length, it is simply cantilevered and apt to bend and damage the shaft support member when subjected to an unexpected force. Moreover, because the shaft support member is provided on the inner periphery of the rear frame, only a narrow space is available in the apparatus body for the operator to attach or detach the shaft support member.

In Prior Art 3, when the image forming unit is pulled out of or inserted into the apparatus body, the developing liquid is apt to wave within a developing tank and overflow the tank, depending on its amount. The liquid overflown the tank would smear the inside of the image forming unit. In light of this, the height of the walls of the tank may be increased, or a cover may be provided on the top of the walls and sealed by a seal member. However, increasing the height of the walls is not a drastic solution because the level of the liquid increases with the amount of the liquid stored in the tank. The problem with the seal member is that the liquid is apt to ooze out due to aging.

In Prior Art 4, the image forming unit often stores the image carrier, the developing roller of the developing section and other rotary bodies therein. Such rotary members must be rotatably supported at least when the image forming unit is brought to its operative position within the apparatus body. To rotatably support a rotary body, it is a common practice to cause, e.g., bearings to receive shaft portions protruding from both ends of the rotary body, as taught in Laid-Open Publication No. 59-165073 mentioned earlier. However, this kind of scheme is not practicable unless the rotary body is provided with opposite end walls and opposite shaft portions, and unless the bearings supporting the shaft portions are replaced at the same time. Assume a developing roller included in a general image forming apparatus although it is not the rotary body to be built in the image forming unit. Then, the developing roller may be implemented as a hollow cylinder open at one end and has the open end supported by a holder member mounted on the apparatus body, as also known in the art.

SUMMARY OF THE INVENTION

It is therefore an object of the present invention to provide an image forming apparatus allowing the individual image forming unit to be mounted to its body with accuracy and high strength, and allowing it to be handled with ease.

It is another object of the present invention to provide an image forming apparatus allowing a shaft support member to position the axis of the shaft of a rotary body accurately.

It is another object of the present invention to provide an image forming apparatus preventing, when an image forming unit storing a developing liquid is mounted to or dismounted from the apparatus body, the liquid from overflowing and smearing the inside of the apparatus.

It is another object of the present invention to provide an image forming apparatus facilitating the mounting and dismounting of an image carrier from an image forming unit.

It is yet another object of the present invention to provide an image forming apparatus facilitating the mounting and dismounting of an image forming unit from the apparatus body.

It is a further object of the present invention to provide an image forming apparatus including at least one rotary body built in an image forming unit and implemented as a hollow cylinder open at least one end thereof so as to reduce the cost of the rotary body or replaceable part, and allowing, at the time of replacement or the like, the rotary body from being rapidly and easily released from a support member supporting the rear end of the rotary body in contact with the open end.

In accordance with the present invention, an image forming apparatus has a body. A plurality of image forming units each includes the respective image carrier and is movable in the axial direction of the image carrier to be selectively mounted to or dismounted from the body. The image forming units are arranged linearly in the direction perpendicular to the axes of the image carriers thereof. A conveyor conveys a recording medium linearly via the image forming units such that the recording medium sequentially passes through image transfer positions respectively facing the image carriers. A body side positioning mechanism positions the end of the individual image forming unit opposite to the end to be operated for mounting and dismounting. A plurality of support members support the end of the individual image forming unit to be operated when the image forming unit is mounted to the body. The support members extend substantially parallel to a linear transport path for the recording medium, but outside of a mounting/dismounting path assigned to the individual image forming unit. A mounting/dismounting side positioning mechanism positions the end of the individual image forming unit to be operated relative to the support members.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
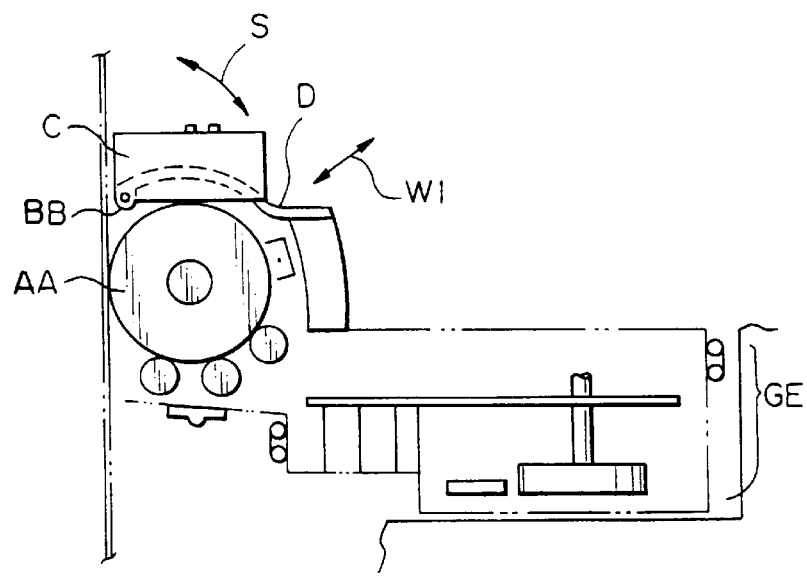
FIG. 1 shows a specific structure included in a conventional image forming apparatus for supporting a cleaning unit.
Figure 2A:
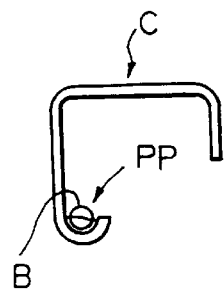
FIGS. 2A and 2B each shows the cleaning device of FIG. 1 in a particular condition.
Figure 2B:
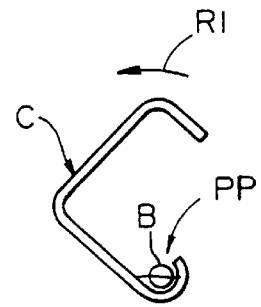

To better understand the present invention, brief reference will be made to a mechanism for moving a cleaning device into and out of contact with a photoconductive element and a structure for supporting the element, taught in Prior Art 3 discussed earlier. At the time of maintenance or inspection, a cleaning device usually held in contact with a photoconductive element must be released from the element. FIG. 1 shows the mechanism for moving the cleaning device toward and away from the photoconductive element. As shown, the photoconductive element is implemented as a drum A by way of example. A cleaning member C is disposed above the drum AA and rotatable about a shaft BB. A support member in the form of an arm D has its one end fixed in place within an image forming unit. The shaft BB is mounted on the other end of the arm D due to the internal configuration of the cleaning member C. Specifically, as shown in FIG. 2A, the cleaning member C is sometimes provided with a trough-like portion PP for receiving a developer collected from the drum AA. As shown in FIG.

Figure 2C:
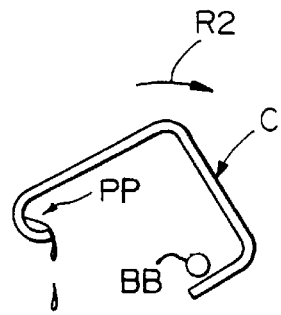
FIG. 2C shows a conventional cleaning device supported by another conventional structure.

2B, the portion or trough PP is so positioned as to prevent the collected developer from dropping when the cleaning member C is moved away from the drum AA (direction indicated by an arrow R1) to allow the drum AA to be removed. In the configuration shown in FIG. 1, the trough PP is coincident in position with the shaft BB. FIG. 2C shows another position of the shaft BB also based on the position of the trough PP shown in FIG. 2A. In FIG. 2C, when the cleaning member C is moved away from the drum AA (direction indicated by an arrow R2), the collected developer drops from the trough PP.

The cleaning member C is rotatable about the shaft BB provided on itself. While the cleaning device is not in operation, e.g., when the drum AA is mounted or dismounted, the cleaning member C is moved away from the drum AA via the shaft BB. The cleaning member C has a free or movable end at the side where a space for pulling out the drum AA is required. In the arrangement shown in FIG. 1, the free end of the cleaning member C faces a space above a developing tank GE and allocated to an optical writing device, not shown. When the cleaning member C is moved away from the drum AA, the drum AA can be moved into or out of the image forming unit in the direction indicated by an arrow W1.

As shown in FIG. 1, the portion of the arm D between the opposite ends extends at the side opposite to the side where the drum AA faces an image transfer position. The arm D is implemented as, e.g., a horizontal piece extending by way of the circumferential surface of the drum AA. With this configuration, the arm D does not interfere with the structural parts of the image forming unit when the unit is mounted or dismounted.

However, the cleaning member C having the shaft BB thereon must be movable over a broad range to allow the drum AA to be mounted and dismounted from the image forming unit. Should the movable range of the cleaning member C be small, the member C would fail to form the space necessary for the drum AA to be mounted or dismounted. However, allocating an extra space for implementing such a movable range would increase the overall size of the apparatus. Further, because the arm D supports the shaft BB with its horizontal portion, it lacks bending rigidity against the weight of the member C. In FIG. 1, the drum AA is removed from the image forming unit in the direction W1, i.e., toward the space above the developing tank GE. In this configuration, the drum AA is apt to interfere with an eraser and a potential sensor, not shown, customarily positioned in the above space.

Figure 3:
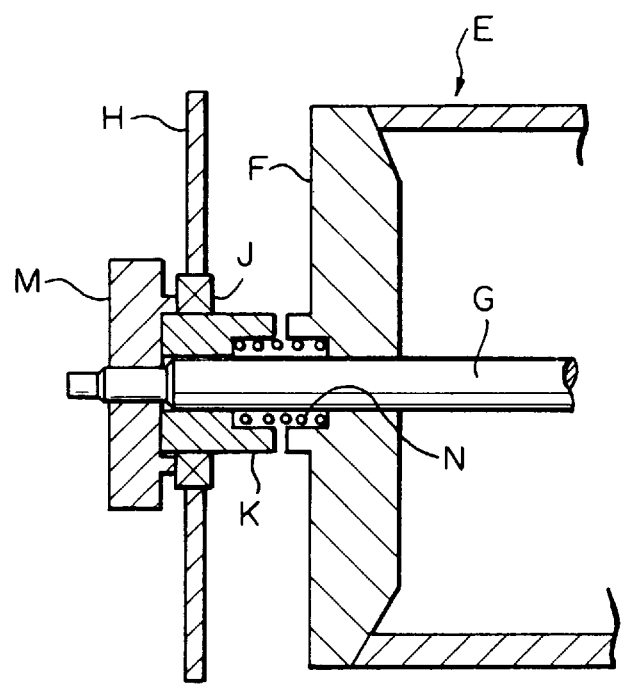
FIG. 3 is a fragmentary section showing a conventional structure for supporting a photoconductive drum and included in an image forming unit.

A photoconductive element is sometimes replaced at the time of maintenance or inspection. A photoconductive element is mounted on a shaft which is usually journalled to the side wall of an image forming unit. FIG. 3 shows the conventional structure for supporting the photoconductive element. As shown, a photoconductive element or drum E is mounted on a drive shaft G which is assumed to be supported by the apparatus body at one end thereof beforehand. The image forming unit is mounted to the apparatus body with the drive shaft G serving as a reference. A flange F is mounted on the end of the drum E at the side opposite to the side where the drive shaft G is supported by the apparatus body. When a side wall included in the image forming unit is mounted to the drive shaft G, the flange F is positioned relative to the end of the drum E.

The other end of the drive shaft G is screwed into a nut member M mounted on the side wall H, and prevented from slipping out of the side wall H thereby. The flange F is prevented from slipping out of the drum E by a boss member K and a spring N. The boss member K is rotatably supported by a bearing J mounted on the side wall H while the spring N is loaded between the boss member K and the flange F. When the nut member M is screwed onto the drive shaft G, it compresses the spring N. The resulting restoring force of the spring N presses the flange F against the end of the drum E. Although the resiliency of the spring N tends to move the boss member K toward the nut member M, it is stopped by the nut member M.

The drum E including the flange F is mounted to the drive shaft G affixed to the apparatus body, as follows. Another flange, not shown, is affixed to the apparatus body together with the drive shaft G beforehand at one axial end of the drum E. The drum or sleeve E having only the circumferential wall is supported by the above flange. To mount the flange F on the drive shaft G, the bearing J and boss member K are fitted in the hole formed in the side wall H, and then the flange F in a floating state is retained by the flange F. Subsequently, the side wall H and flange F are coupled over the drive shaft G. Finally, the nut member M is screwed onto the end of the drive shaft G.

As stated above, the image forming unit is mounted to the apparatus body by use of the drive shaft of the drum as a reference, and then the drive shaft is supported by the image forming unit. The problem with this procedure is that after the bearing J and boss member K have been mounted to the side wall of the image forming unit, the drive shaft G and boss member K must be positioned relative to each other by a trial and error procedure, wasting time and labor.

Preferred embodiments of the image forming apparatus in accordance with the present invention will be described which are free from the problems of Prior Art 1 through Prior Art 4.

1st Embodiment

Figure 4:
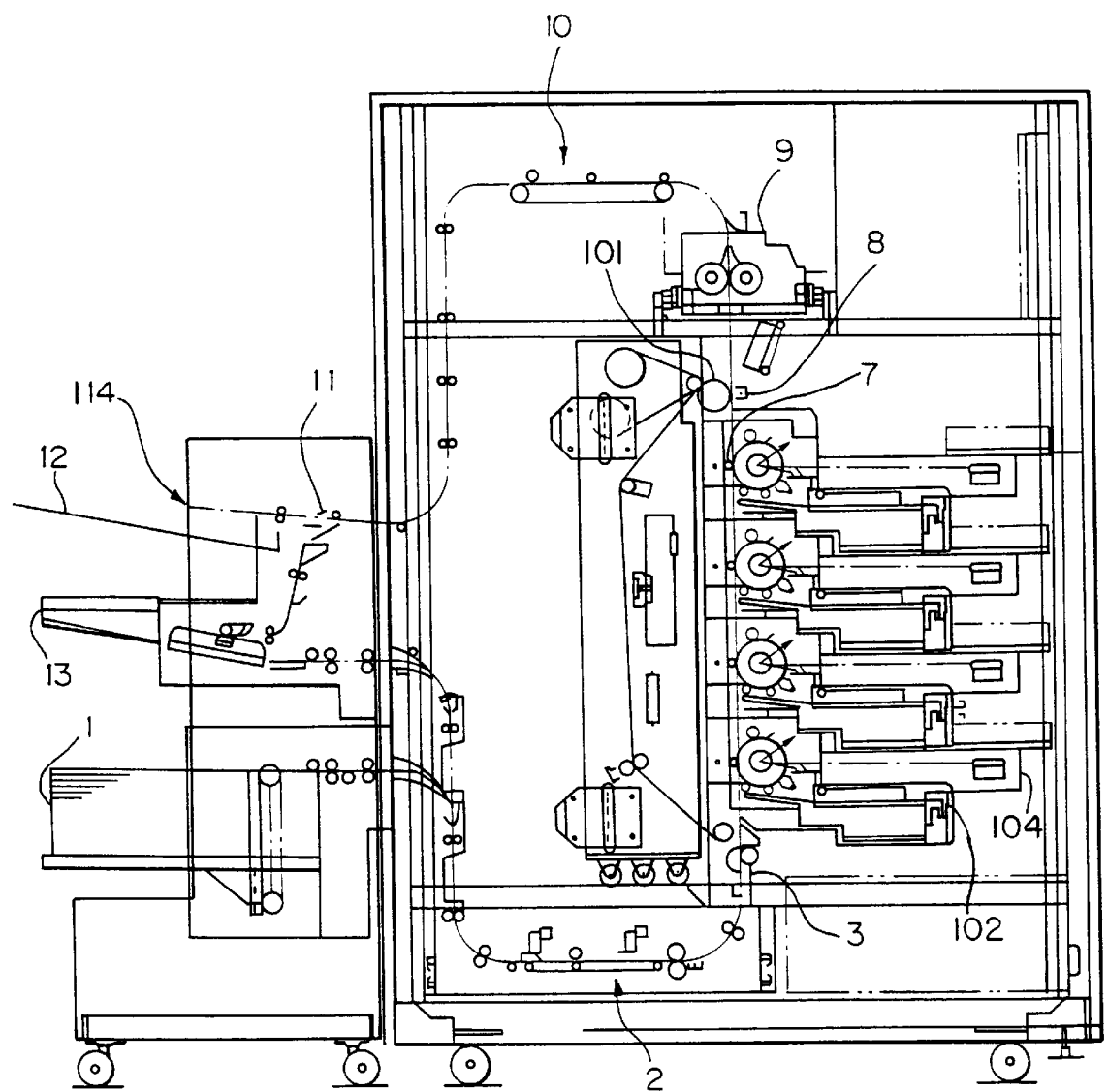
FIG. 4 shows a first embodiment of the image forming apparatus in accordance with the present invention.

This embodiment is implemented as a color image forming apparatus including four image forming units. As shown in FIG. 4, the apparatus includes a sheet feed unit 1 loaded with a stack of sheets or recording media. A sheet fed from the sheet feed unit 1 is adjusted in horizontal position by a horizontal registration unit 2, and then conveyed by way of a leading edge registration sensor 3. Four image forming units or process units each has the respective photoconductive drum or image carrier. The process units 102 are sequentially arranged vertically, i.e., perpendicularly to the axes of the drums. An optical writing unit 104 assigned to the respective process unit 102 writes an electrostatic latent image on the associated drum in accordance with image data at a particular timing based on the output of the registration sensor 3. The sheet moved away from the registration sensor 3 is electrostatically retained by a conveyor belt or conveying means 101. The conveyor belt 101 sequentially conveys the sheet by way of image transfer positions respectively assigned to the four process units 102. While the sheet is passed through the image transfer position of any one of the process units 102, a transfer roller or image transferring means included in the process unit 102 transfers an image from the associated drum to the sheet. A separation charger 8 separates the sheet carrying the image thereon from the conveyor belt 101. Then, a fixing unit 9 fixes the image on the sheet by applying heat and pressure to the sheet. The sheet with the fixed image is driven toward a conveyor unit 10. A path selector or guide 11 is operated to select either a tray 12 or a duplex unit 13. When the path selector 11 selects the duplex unit 13, the sheet carrying the image on one side thereof is switched back toward the duplex unit 13. After several sheets have been stacked on the duplex unit 13, they are sequentially refed toward the conveyor belt 101.

Figure 5A:
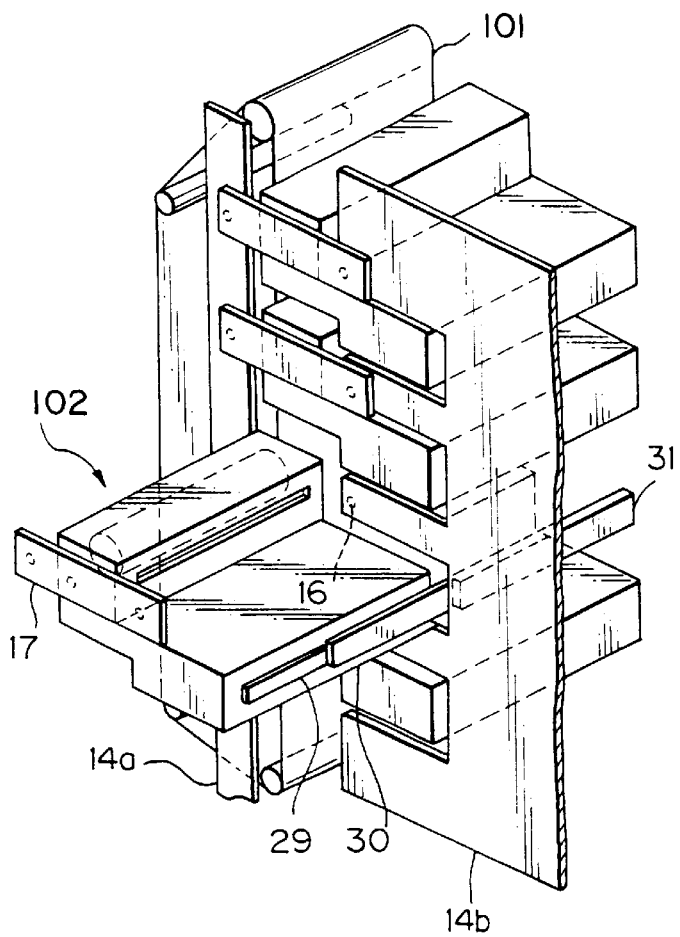
FIG. 5A is a perspective view of process units included in the first embodiment together with members surrounding them.

To replace any one of the process units 102, it is necessary for the process unit 102 to be pulled out toward the front of the apparatus body. In the illustrative embodiment, as shown in FIG. 5A, the process units 102 mounted to the apparatus body have their end portions to be operated by hand (front end portions hereinafter) supported by a plurality of support members 14a and 14b. The support members 14a and 14b extend substantially parallel to the linear path along which the conveyor belt 101 conveys the sheet, but outside of the paths along which the process units 102 are mounted and dismounted.

Figure 6:
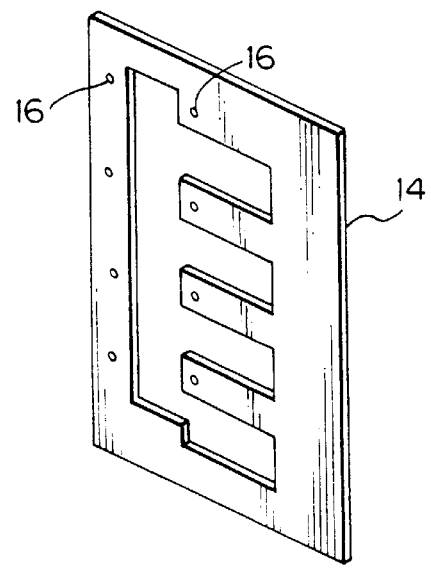
FIG. 6 is a perspective view showing a modification of a support member included in the first embodiment.
Figure 7A:
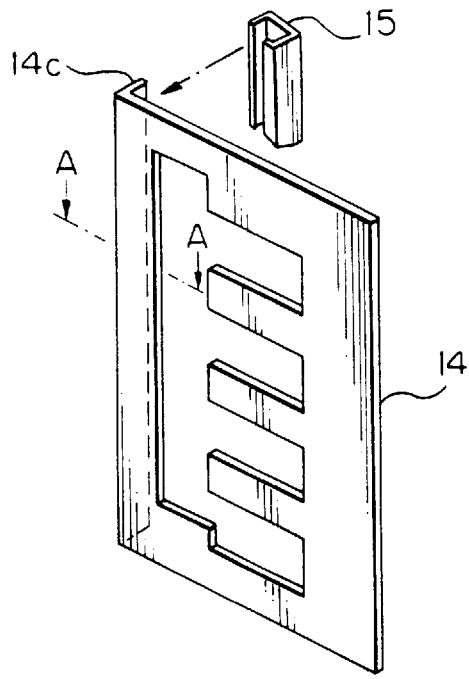
FIG. 7A is a perspective view showing another modification of the support member.
Figure 7B:
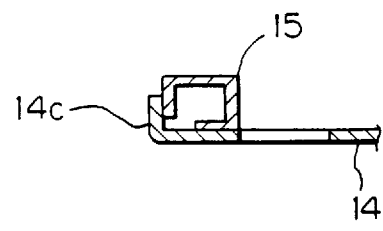
FIG. 7B is a section along line A—A of FIG. 7A.

As shown in FIG. 6, the support members 14a and 14b may be implemented as a single molding 14 capable of being produced with accuracy. The single molding can preserve its accuracy against aging as well. As shown in FIGS. 7A and 7B, to increase the strength of the support member 14, the support member 14 may be formed with a bent portion 14c at its edge, and a reinforcing member 15 may be affixed to the rear of the bent portion 14c in a tubular configuration. Alternatively, a tubular member or a partly removed tubular member may be affixed to the rear of the straight edge of the support member 14.

Figure 5B:
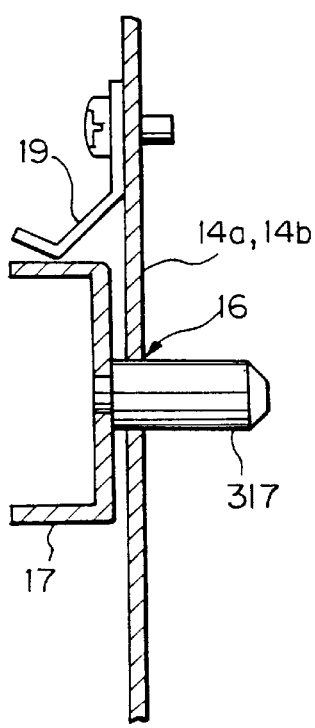
FIG. 5B is a section showing a mechanism for positioning any one of the process units of the first embodiment.

In the illustrative embodiment, a positioning mechanism or positioning means is provided for positioning the front end of each process unit 102 to be operated by hand relative to the support members 14a and 14b. As shown in FIG. 5B, the positioning mechanism consists of holes 16 and pin 317 (only one is visible each). The hole or portion to be engaged 16 is formed in each of the support members 14a and 14b. The pin or portion to engage 317 is studded on a positioning plate 17 included in the process unit 102, and capable of mating with the respective hole 16. The pin 317 loosely fits in the hole 16 in order to allow the process unit 102 to be removed. In light of this, as shown in FIG. 5B, a presser member 19 is affixed to the support member 14b in order to press the positioning plate 17 in one direction. In this configuration, the process unit 102 can be located at the same position at all times despite the mounting and dismounting of the process unit 102.

As shown in FIG. 5A, a guide member 29 is mounted on the side wall of each process unit 102 while a guide rail 31 is mounted on the apparatus body. The process unit 102 is inserted into the apparatus body with its guide member 29 guided by the guide rail 31 via a slide rail 30. At the rear of the process unit 102, the drive shaft of the drum is supported by the rear wall of the apparatus body. The front end of the process unit 102 is supported by and positioned relative to the support members 14a and 14b.

As stated above, in this embodiment, the front end of each process unit 102 is supported by the support members 14a and 14b when the unit 102 is mounted to the apparatus body. The positioning mechanism positions the process unit 102 relative to the support members 14a and 14b in the vicinity of the shaft of the drum. The process unit 102 can therefore be accurately positioned relative to the apparatus body.

The support members 14a and 14b can be affixed to the structural body of the apparatus at opposite ends thereof in the direction of sheet conveyance. This allows each process unit 102 to be positioned relative to the apparatus body with a sufficient mechanical strength.

Because the individual process unit 102 is supported by the apparatus body independently of the other process units 102, only the desired process unit 102 can be mounted and dismounted with ease.

It is not necessary to position the support members 14a and 14b between nearby process units 102. This successfully reduces the clearance or pitch between the process units 102 and thereby reduces the overall size of the apparatus.

Figure 8:
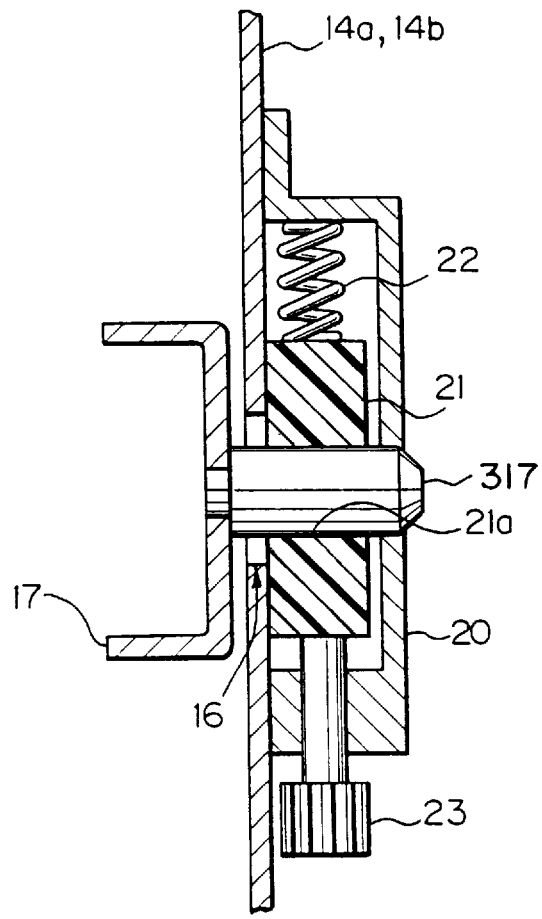
FIG. 8 is a section shows a modification of a mechanism for positioning the process unit.

The positioning mechanism may additionally include adjusting means for allowing the front end of the individual process unit 102 to be adjusted in position relative to the support members 14a and 14b independently of the other process units 102. The adjusting means allows the misregister of colors ascribable to the dislocation of any of the process units 102 to be corrected with ease. FIG. 8 shows a specific configuration of the adjusting means. As shown, the positioning holes 16 formed in the support members 14a and 14b are each provided with a diameter sufficiently greater than the diameter of the pins 317. A case 20 is mounted on the side of each support member 14a or 14b. An adjusting member 21 is disposed in the casing 20 in such a manner as to be movable in one direction. A hole 21a is formed in the adjusting member 21 for receiving the associated pin 317 of the positioning plate 17. A spring 22 constantly biases the adjusting member 21 in one direction. A screw 23 may be operated to adjust the position of the adjusting member 21 by pressing it against the action of the spring 22.

Figure 9A:
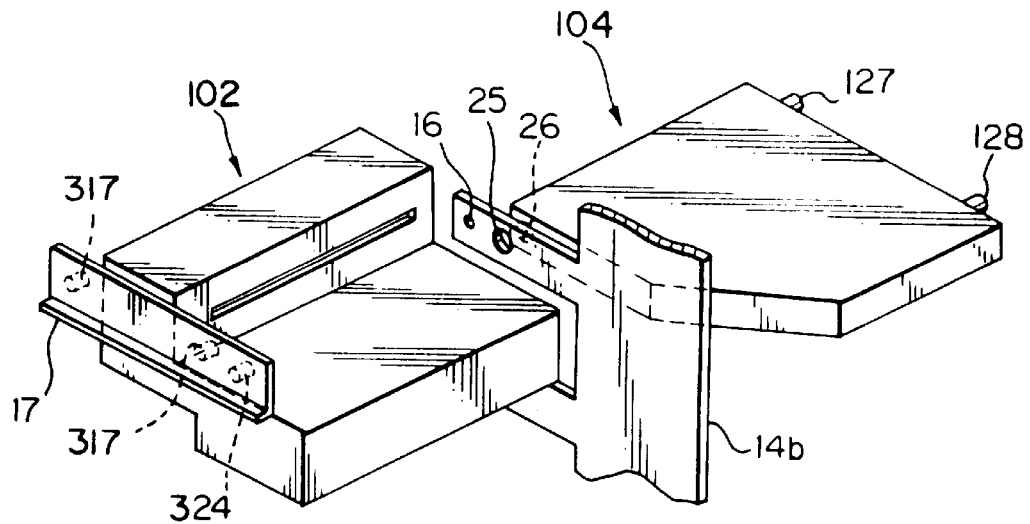
FIG. 9A is a perspective view showing another modification for positioning the process unit and an optical writing unit associated with the process unit.
Figure 9B:
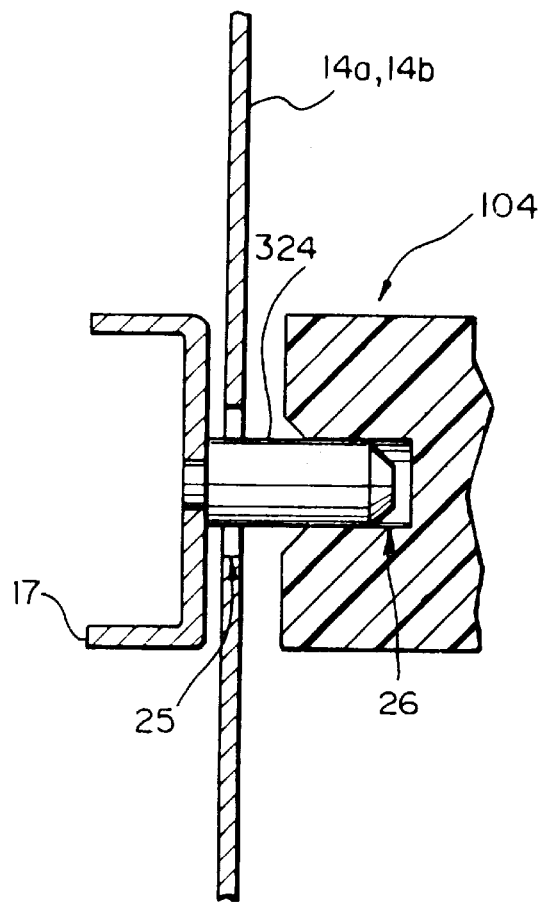
FIG. 9B is a section of the modification shown in FIG.9A.

Further, the positioning mechanism may additionally be used to position the front end of the optical writing unit 5 relative to the body of the process unit 102. With this configuration, it is possible to support and position the process unit 102 and writing unit 104 surely and accurately with a minimum number of parts, and to minimize even slight dislocation ascribable to mounting and dismounting. FIGS. 9A and 9B show a specific configuration of such a mechanism. As shown, a pin 324 is studded on the positioning plate 17 of each process unit 102 in addition to the pins 18. A hole 25 is formed in the support member 14b for receiving the pin 324. A hole 26 is formed in one side of the writing unit 104 for receiving the pin 324 passed through the hole 16. When the process unit 102 is mounted to the apparatus body, the pin 324 mates with the hole 26 via the hole 16, positioning the writing unit 104. Pins 127 and 128 are studded on the rear end of the writing unit 104 and capable of mating with the rear wall of the apparatus body, not shown.

The adjusting mechanism shown in FIG. 8 may also be applied to the positioning mechanism shown in FIGS. 9A and 9B in order to adjust the process unit 102 and writing unit 104 relative to each other.

While the above embodiment has concentrated on four process units arranged one above the other in the vertical direction, the present invention is practicable even with process units sequentially arranged in a direction inclined from the vertical direction.

2nd Embodiment

This embodiment is also implemented as a color image forming apparatus and similar to the first embodiment as to the general construction. The same or similar structural elements are designated by identical reference numerals, and a detailed description thereof will not be made in order to avoid redundancy. This embodiment is characterized in that a transfer unit or conveying means 32 including the conveyor belt 101 and drive means for driving the belt 101 is bodily rotatable about the apparatus body side opposite to the mounting and dismounting side.

Figure 10:
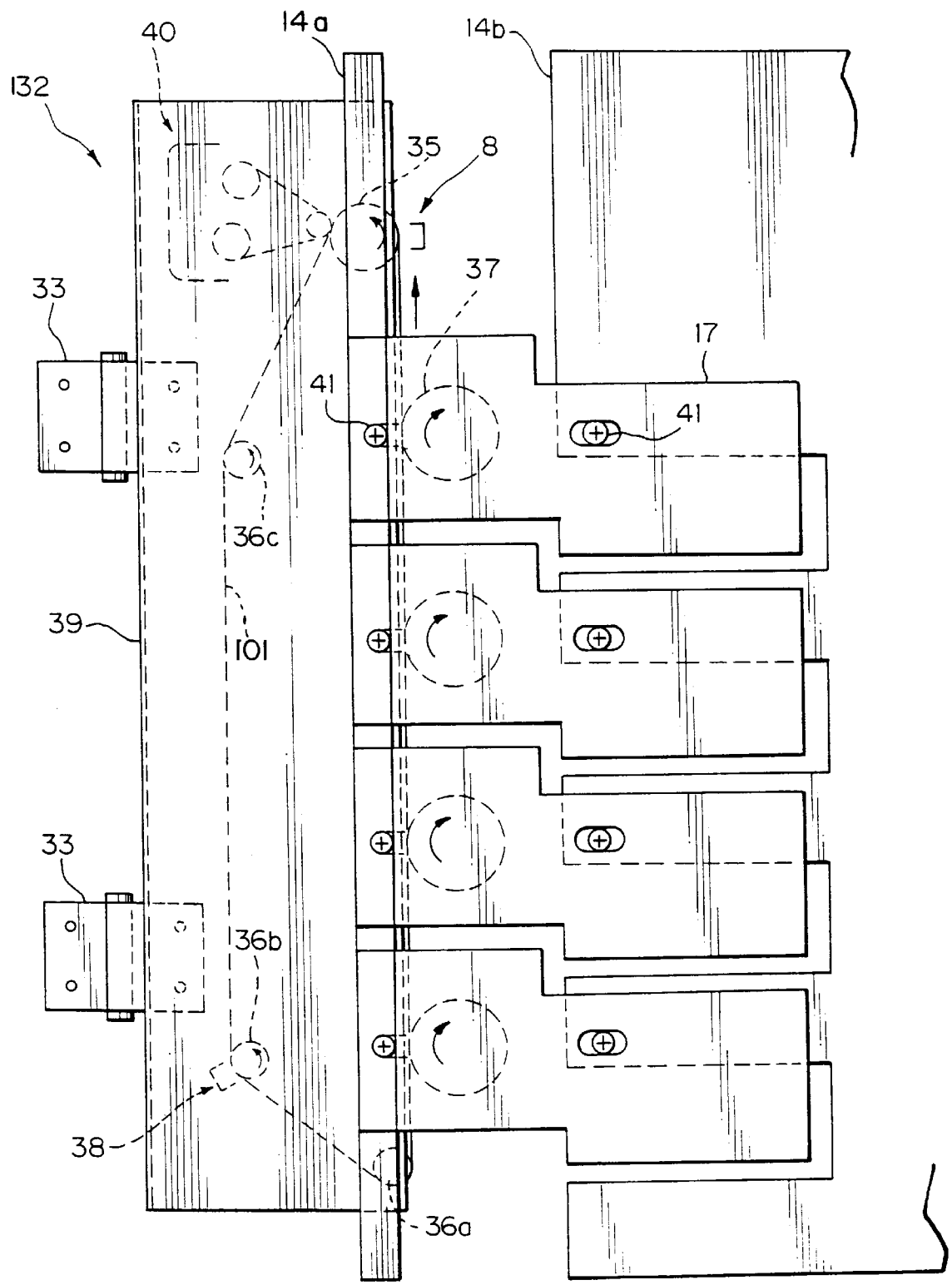
FIG. 10 is a front view showing a second embodiment of the present invention.
Figure 11A:
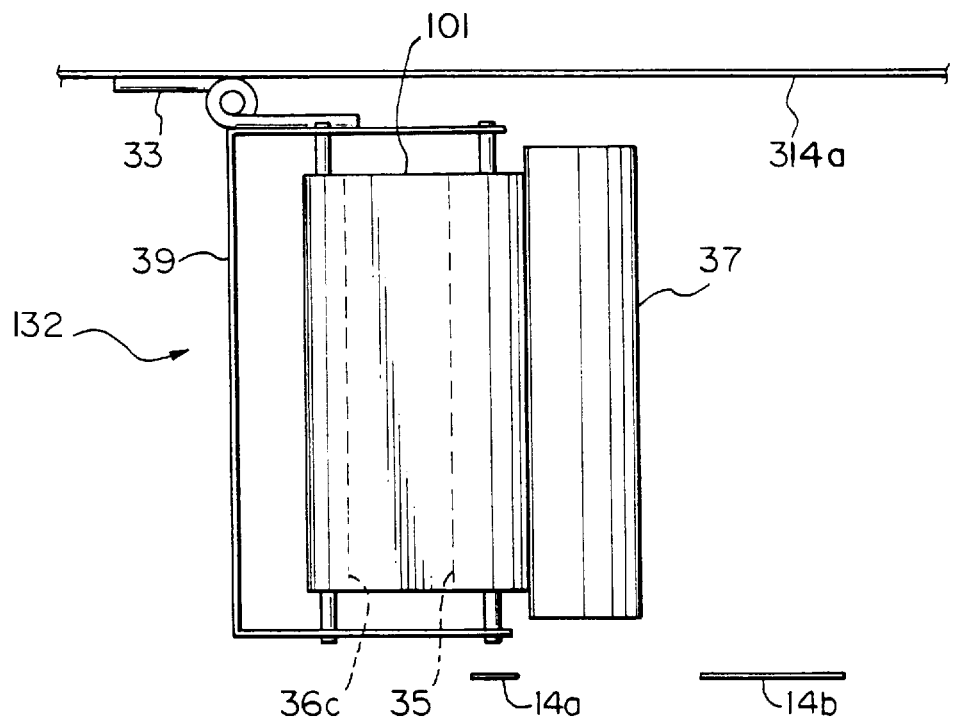
FIGS. 11A and 11B are plan views each showing a transfer unit included in the second embodiment in a particular condition.
Figure 11B:
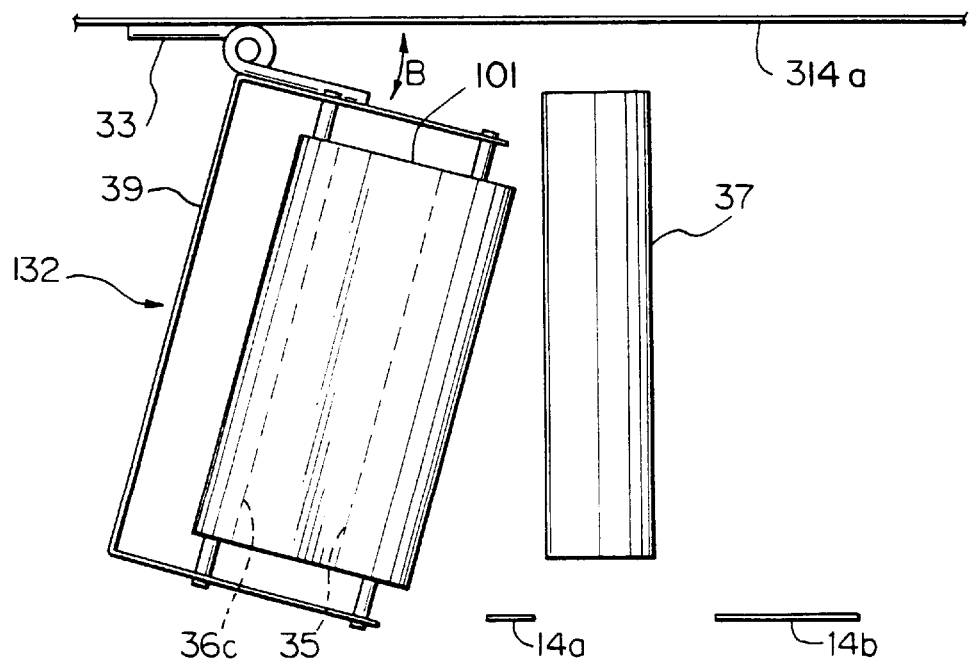

As shown in FIG. 10, 11A and 11B, the transfer unit 32 is fastened to the rear wall 314a of the apparatus body by hinges 33. The transfer unit 132 is therefore bodily rotatable about the apparatus body side opposite to the side where the process units 102 are mounted and dismounted, as indicated by an arrow B in FIG. 11B. The transfer unit 132 includes, in addition to the conveyor belt 101 and transfer rollers 204, a drive roller 35 and a plurality of driven rollers 36a, 36b and 36c over which the belt 101 is passed, a discharger 38 for dissipating potential remaining on the belt 101, and a casing 39. As shown in FIG. 10, the transfer unit 132 may further include a cleaning device 40 for cleaning the belt 101.

Assume that the transfer unit 132 is rotated about the apparatus body side, as shown in FIG. 11B. Then, the operator can easily remove a sheet jamming the path between the transfer unit 132 and any one of the process units 102.

Figure 12:
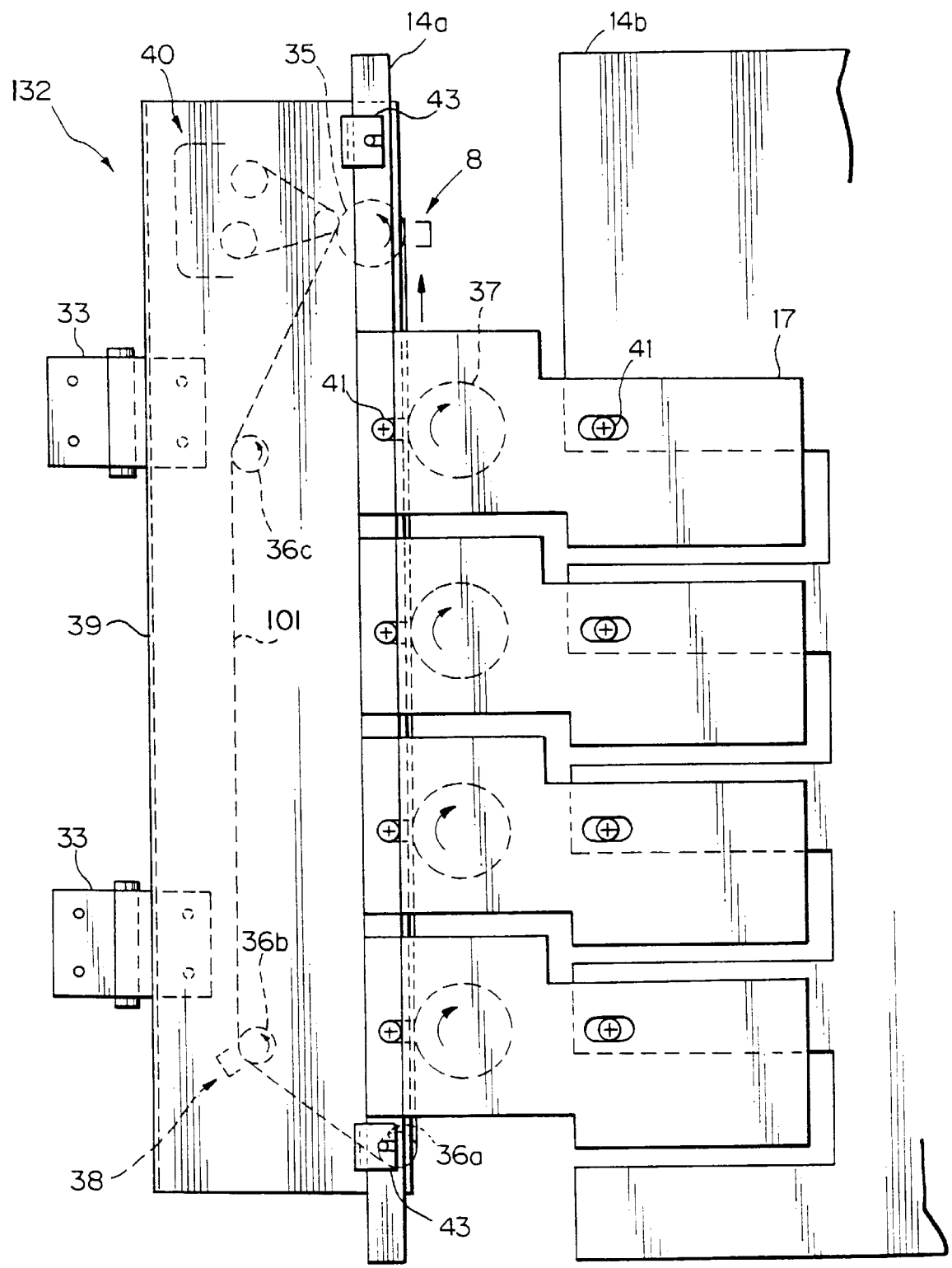
FIG. 12 is a front view showing a mechanism for positioning the transfer unit and representative of a modification of the second embodiment.
Figure 13:
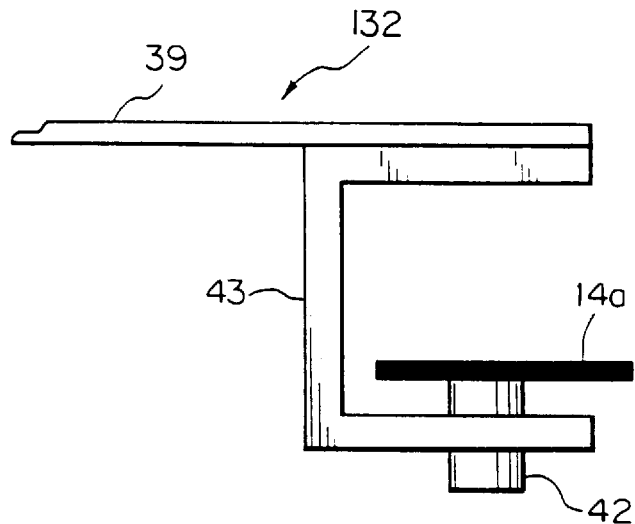
FIG. 13 is a plan view of the positioning mechanism shown in FIG. 12.

The embodiment may additionally include a positioning mechanism or means for positioning the transfer unit 132 accurately relative to the process units 102 and thereby insuring high image quality. FIGS. 12 and 13 show a specific configuration of the positioning mechanism. As shown, positioning pins 41 are studded on the front support member 14a for supporting the process units 102 and positioning them relative to the apparatus body. Further, pins 42 are studded on the vertically opposite ends of the support member 14a for positioning the transfer unit 132. Positioning blocks 43 are mounted on the casing 39, and each mates with the respective pin 42. With this mechanism, it is possible to position the transfer unit 132 by using the support members supporting the process units 102.

Figure 15:
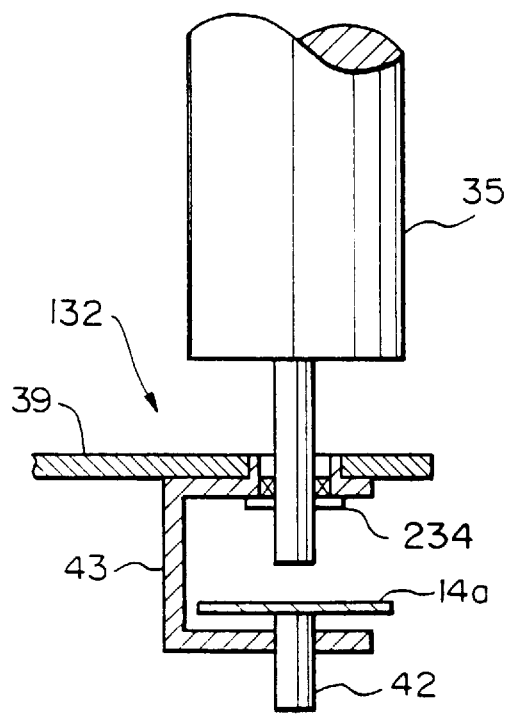
FIG. 15 is a plan view of a positioning mechanism included in the modification of FIG. 14.
Figure 14:
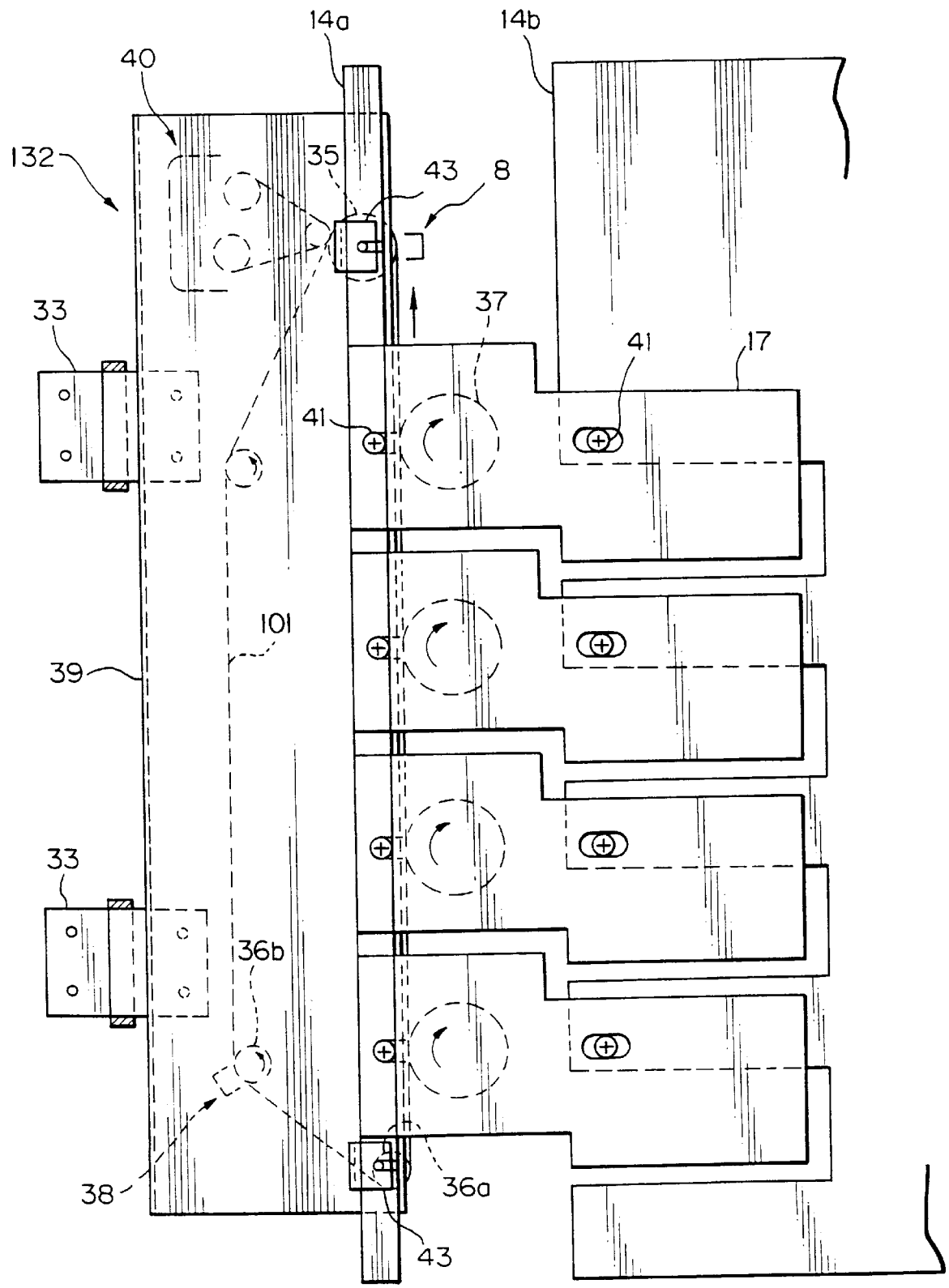
FIG. 14 is a front view showing a transfer unit representative of another modification of the second embodiment, and an arrangement adjoining it.
Figure 16:
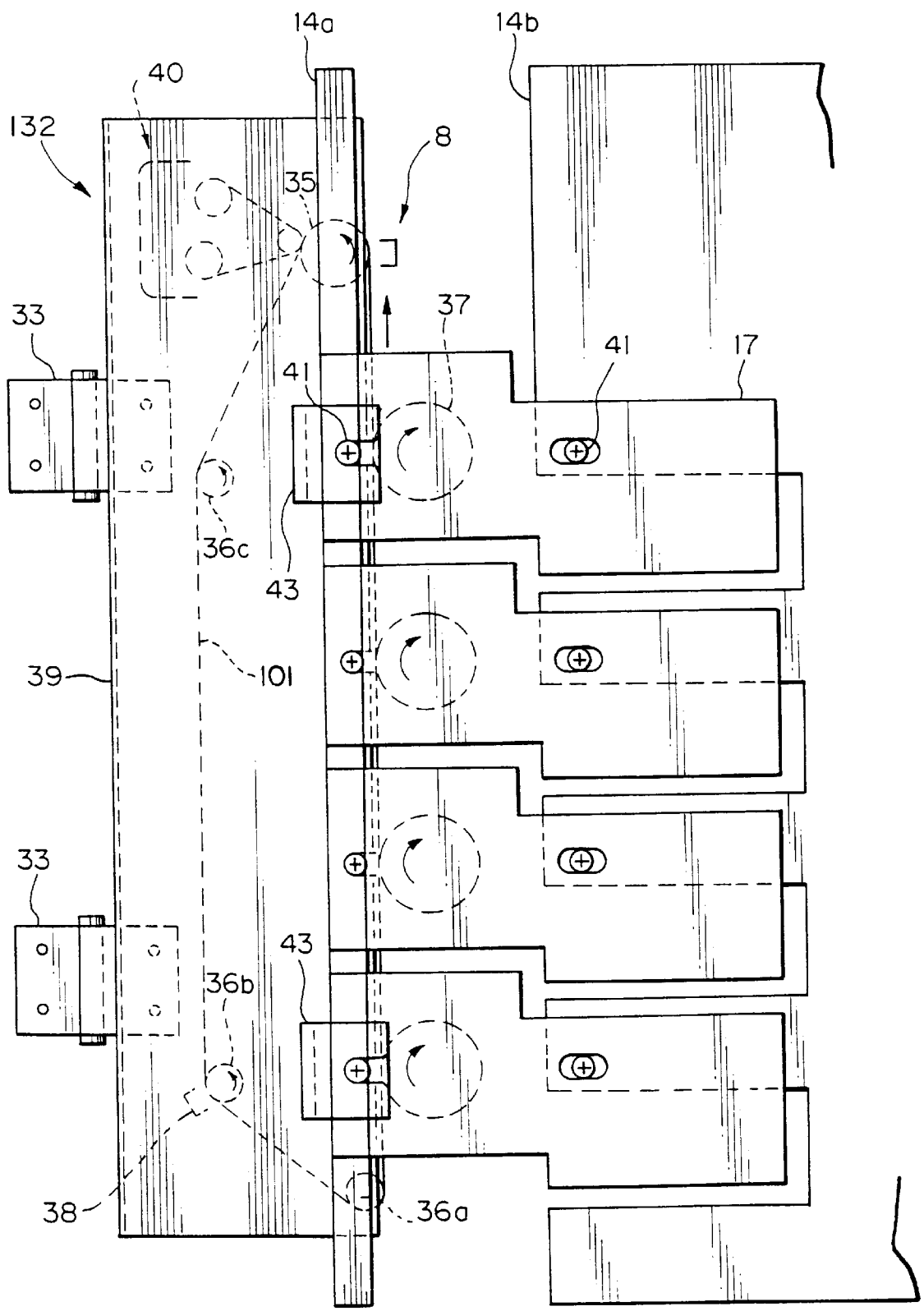
FIGS. 16, 17A and 17B, and 18A and 18B are front views each showing a mechanism for positioning the transfer unit and representative of still another modification of the second embodiment.

As shown in FIGS. 14 and 15, an arrangement may be made such that the pin 42 studded on the support member 14a coaxially with the drive roller 35 mates with the positioning block 43. More specifically, as shown in FIG. 15, after the block 43 and the casing 39 of the transfer unit 132 have been connected together, a bearing 234 is affixed to the block 43 in order to support the shaft of the drive roller 35. This allows, when the pin 42 and block 43 are engaged with each other, the apparatus body and drive roller 35 to be positioned relative to each other without the load of the transfer unit 132 acting on the shaft of the drive roller 35. If desired, as shown in FIG. 16, the pins 41 of the process units 102 may play the role of the pins 42 of the transfer unit 132 at the same time.

Figure 17A:
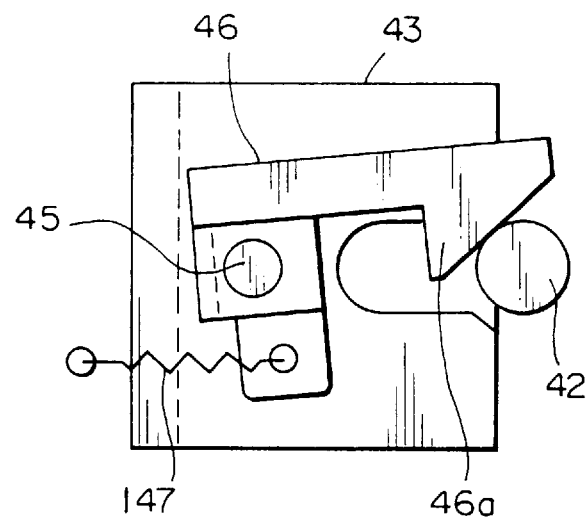
Figure 17B:
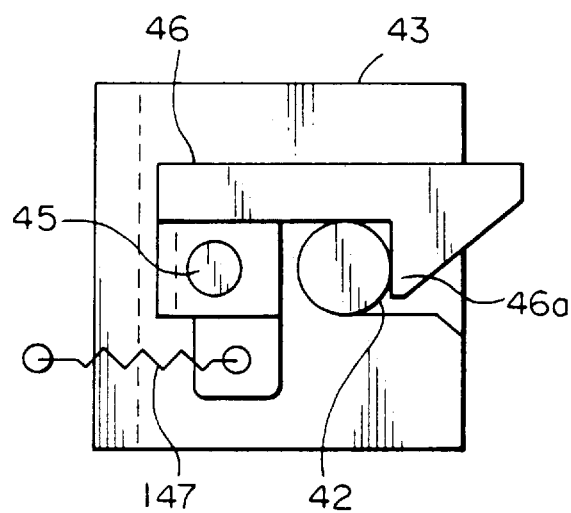

As shown in FIGS. 17A and 17B, a locking mechanism may be provided for locking the pin 42 of the transfer unit 132 to the block 43. As shown, the locking mechanism includes a latch 46 rotatable about a pin 45 studded on the block 43. As shown in FIG. 17A, when the transfer unit 132 is set, the pin 42 pushes up the free end 46a of the latch 46. As shown in FIG. 17B, when the pin 42 is fully received in the block 43, the latch 46 stops the pin 42 due to the action of a spring 147. As a result, the block 43 is prevented from slipping out of the pin 42. An unlocking procedure will not be described because it is not relevant to the understanding of such a mechanism.

Figure 18A:
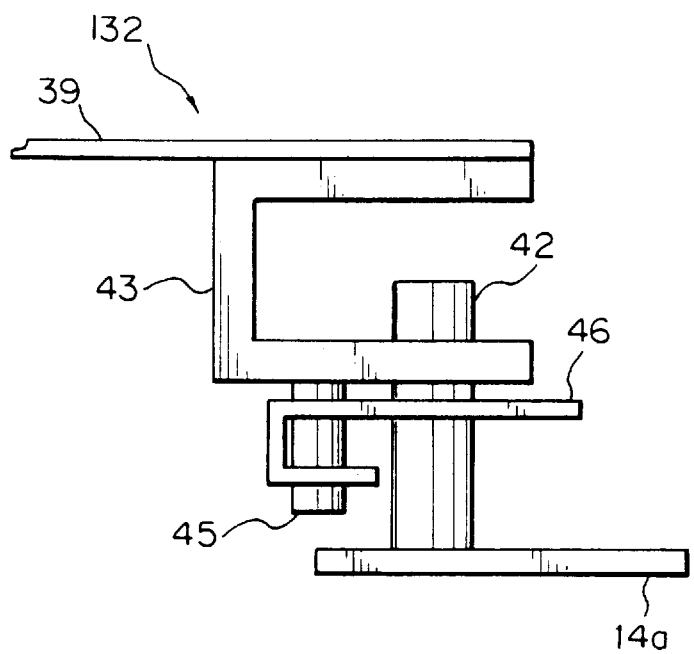
Figure 18B:
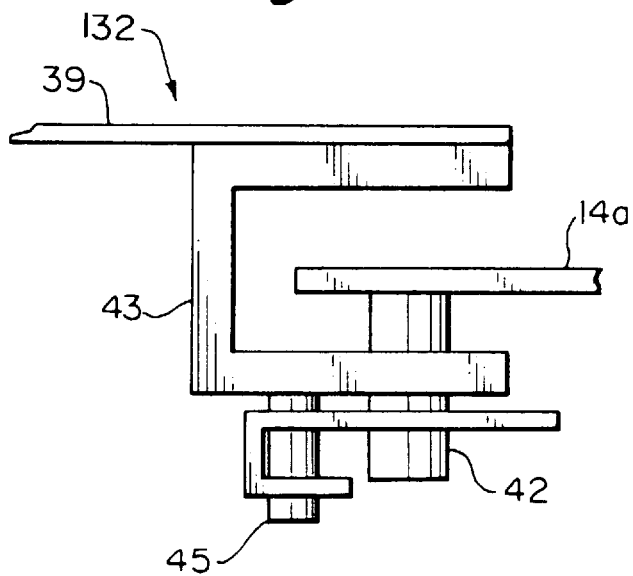

The above locking mechanism may be arranged outside of the support member 14a, as shown in FIG. 18A, or inside of the same, as shown in FIG. 18B. The arrangement shown in FIG. 18B is advantageous over the arrangement of FIG. 18A because it enhances the miniaturization of the apparatus. Specifically, in the arrangement of FIG. 18A, the support member 14a must be located at a position spaced more than necessary from the front end of the casing 39 of the transfer unit 132. The arrangement of FIG. 18B allows the distance between the rear wall, not shown, of the apparatus body and the support member or front wall 14a to be reduced, so that the apparatus body can be provided with a compact configuration.

While the first and second embodiment have concentrated on the vertical arrangement of the process units 102, the present invention is similarly practicable even when the process units 102 are arranged in the horizontal direction.

3rd Embodiment

Figure 19:
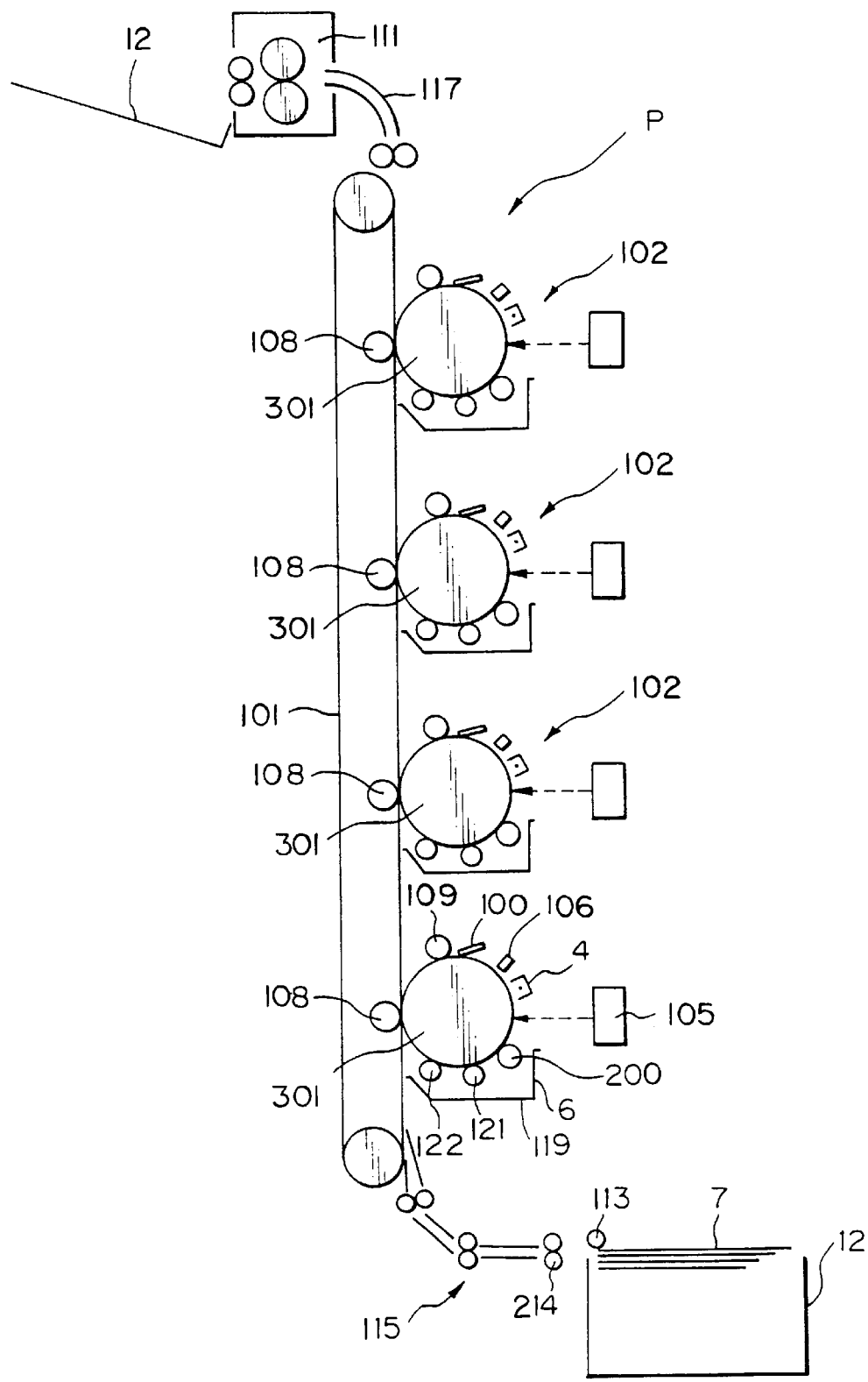
FIG. 19 shows a third embodiment of the present invention.

Referring to FIG. 19, an image forming apparatus P includes image forming sections 102 arranged one above the other in the direction of rotation of a conveyor belt or transfer belt 101. The image forming sections 102 are each assigned to a particular color. A photoconductive drum 301 is included in each image forming section 102 and rotatable clockwise, as viewed in FIG. 19. While the drum 301 is in rotation, a charger 4 charges the surface of the drum 301 uniformly. A latent image forming section 105 forms a latent image on the charged surface of the drum 301 by scanning it with a laser beam. A developing section 6 develops the latent image so as to produce a corresponding toner image. A transfer section 108 transfers the toner image from the drum 301 to a sheet 7 being conveyed by the conveyor belt 101. After the image transfer, a cleaning roller 109 and a cleaning blade 100 remove the toner remaining on the drum 301. Further, a discharge lamp 106 discharges or initializes the drum 301.

Disposed below the conveyor belt 101 are a pick-up roller 113, a separator 214, a sheet feed section 15 and so forth. The pick-up roller 113 feeds the uppermost one of sheets 7 stacked on a tray 12. The sheet picked up by the roller 113 is separated from the underlying sheets by the separator 214 and then guided toward the conveyor belt 101 by the sheet feed section 115. A sheet discharge section 117 is positioned above the transfer belt 101 in order to drive the sheet 7 separated from the belt 101 toward a fixing section 111. After the fixing section 16 has fixed the toner image on the sheet 7, the sheet 7 is driven out to a tray 12.

In this embodiment, the developing section 6 uses a developing liquid. Specifically, the developing section 6 includes a container 119 storing toner together with a solution, a developing roller 200 for supplying the drum 301 with the toner, a reverse roller 121 for leveling the toner on the drum 301 to a uniform thickness, and an electric field roller 122 for causing the toner on the drum 301 to cohere.

Figure 20:
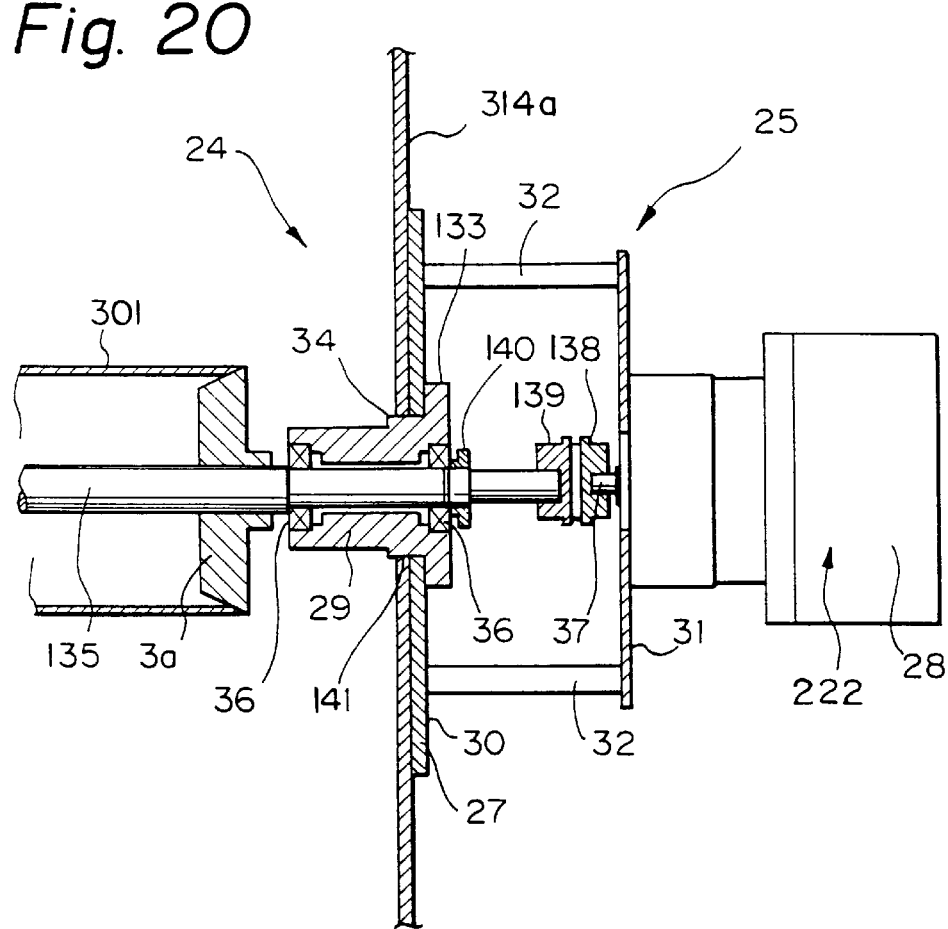
FIG. 20 is a vertical section showing a drive unit included in the third embodiment.
Figure 21:
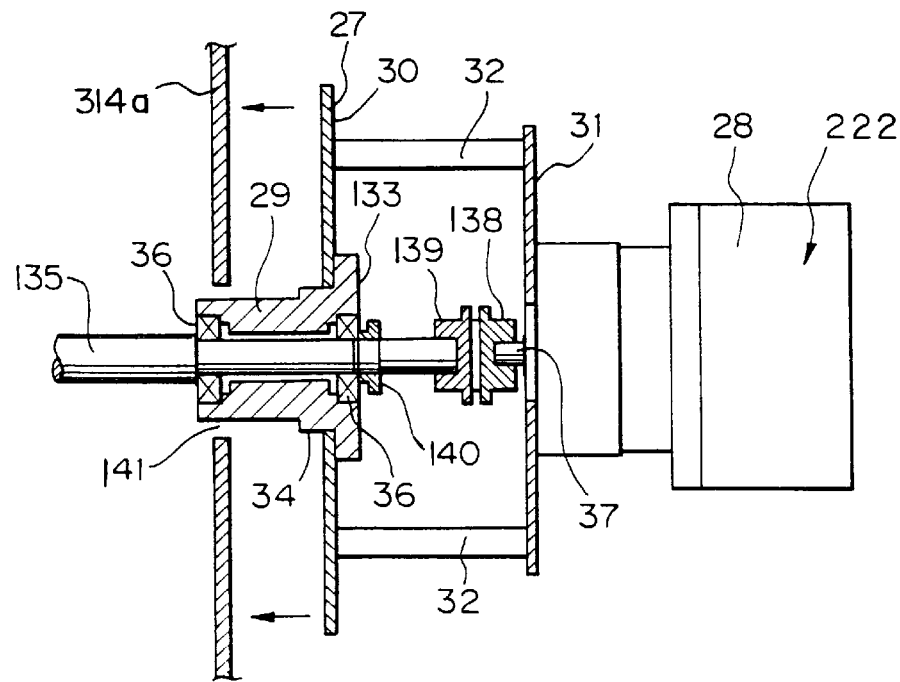
FIG. 21 is a vertical section showing a relation between a positioning portion formed in a side wall and a shaft support member included in the drive unit of FIG. 20.

FIG. 20 and 21 show a structure for supporting the drum 301 and a structure for driving it. As shown, the body, not shown, of the apparatus P includes a rear wall 314a. A front wall, not shown, is positioned in front of (at the left-hand side as viewed in FIG. 20) of the rear wall 314a. Therefore, a space 24 at the left-hand-side of the rear wall 314a is the inside of the apparatus body while a space 25 at the right-hand side of the same is the outside of the apparatus body. A drive unit 222 for driving the drum 301 is disposed in the space 25.

The drive unit 222 has a mount 27 and a motor or drive source 28 and a shaft support member 29 which are mounted on the mount 27. The mount 27 is made up of a base 30 affixed to the rear wall 314a, a bracket 31 supporting the motor 28, and a plurality of studs 32 connecting the base 30 and bracket 31. The shaft support member 29 is a hollow cylindrical member including a large diameter portion 34. The large diameter portion 34 terminates at a flange 133 at one end thereof. The flange 133 is affixed to the outer surface of the base 30. Bearings 234 are affixed to both ends of the shaft support member 29 at a preselected distance from each other. A drum shaft 135 is rotatably supported by the bearings 234. A coupling member 138 is affixed to the end of a motor shaft 37 directly connected to the motor 28. A coupling member 139 is affixed to the rear end of the motor shaft 37. A nut 140 is screwed onto the drum shaft 135. The axial movement of the drum shaft 135 is limited by the abutment of the nut 140 and the flange 133 of the shaft support member 29. The rear plate 314a is formed with a hole or positioning portion 141 in which the large diameter portion 34 of the shaft support member 29 is received. As shown in FIG. 21, the drive unit 222 is an independent structural body separate from the rear wall 314a. The shaft support member 29 is received in the opening 141 while the base 30 is affixed to the back of the rear wall 23.

Figure 22:
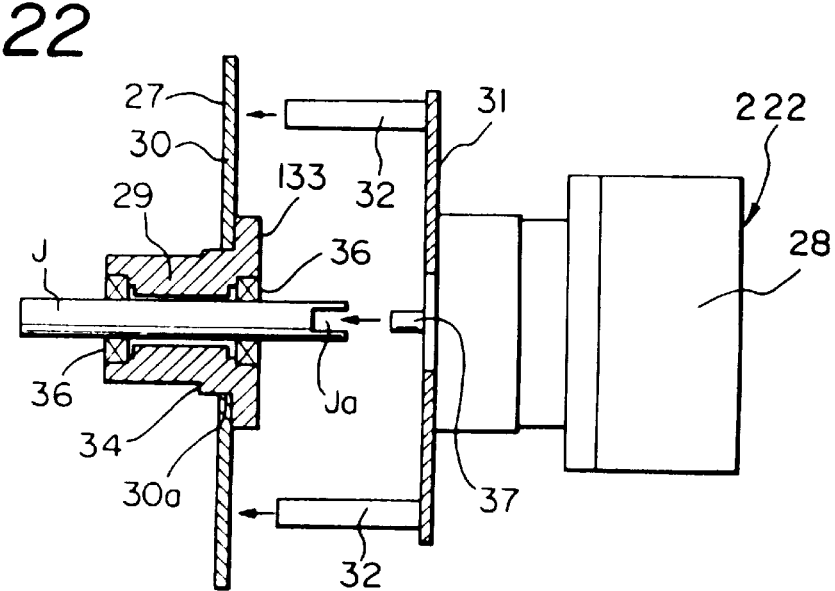
FIG. 22 is a vertical section demonstrating the assemblage of the drive unit of the third embodiment using a jig.

As shown in FIG. 22, to assemble the drive unit 222, the large diameter portion 34 of the shaft support member 29 is fitted in a hole 30a formed in the base 30 beforehand. The motor bracket 31, motor 28 and studs 32 are also assembled beforehand. A shaft-like jig J has the same diameter as the drum shaft 135 and has a notch Ja at one end thereof. After the jig J has been passed through the shaft support member 29 via the bearings 234, the end of the motor shaft 37 is caused to mate with the notch Ja with the studs 32 abutting against the base 30. Then, the jig J is pulled out of the shaft support member 29. As a result, the drive unit 222 is assembled with the axis of the shaft support member 29 and that of the motor shaft 37 aligning with each other.

The drum 301 has flanges 3a affixed to both ends thereof. A casing, not shown, having a pair of support plates, not shown, supports both ends of the drum 301 while allowing the drum 301 to rotate. The casing is disposed in the space 24 and may be pulled out, as desired. The flanges 3a are mounted on the drum shaft 135 in such a manner as to be slidable in the axial direction, but not rotatable relative to the shaft 135. The drums 301 are each driven by the respective drive unit 26 having the above configuration.

While the drum 301 is in rotation, a latent image is formed and then developed. Specifically, the rotation of the motor 28 is transmitted to the flanges 3a of the drum 301 via the motor shaft 37, coupling members 138 and 139, and drum shaft 135. The drum 301 can rotate at its accurate position because the axis of the shaft support member 29 is determined by the hole 41, because the axis of the drum shaft 135 is determined by the shaft support member 29, and because the flanges 3a of the drum 301 are mounted on the drum shaft 135.

When the casing is pulled out of the apparatus body for maintenance or inspection, the drum 301 is exposed to the outside at the front of the apparatus body. At this instant, the drum shaft 135 remains on the apparatus body while being supported by the shaft support member 29. In this condition, the operator can easily replace, e.g., the shaft support member 29 by dismounting the drive unit 222 from the rear wall 314a, using a broad space available at the rear of the apparatus body.

The shaft support member 29 is received in the hole 41 formed in the rear wall 314a, as stated above. Therefore, only if the large diameter portion 34 of the member 29 is fitted in the hole 41, the drum shaft 135 is positioned accurately and easily relative to the apparatus body.

4th Embodiment

Figure 23:
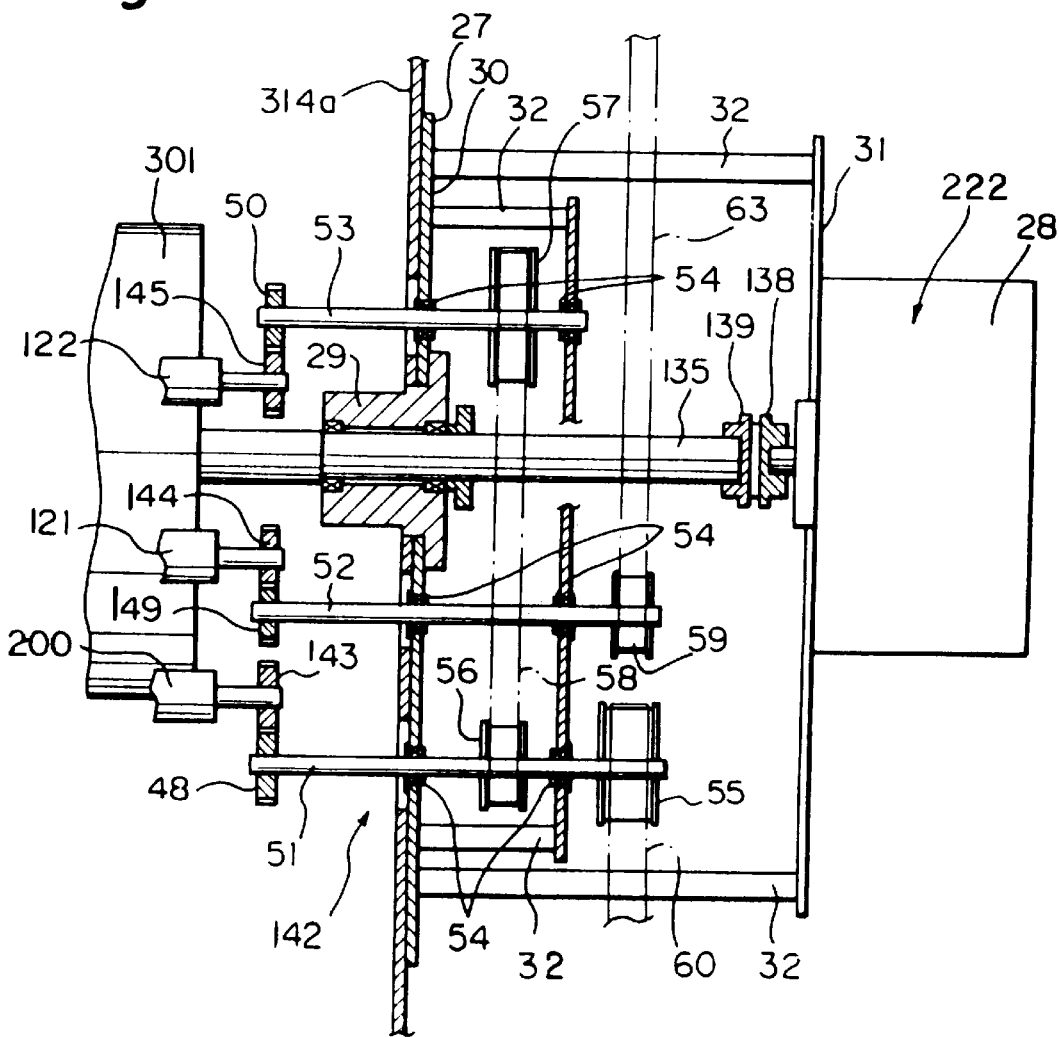
FIG. 23 is a vertically sectioned side elevation showing a drive unit and a drive transmission device representative of a fourth embodiment of the present invention.
Figure 24:
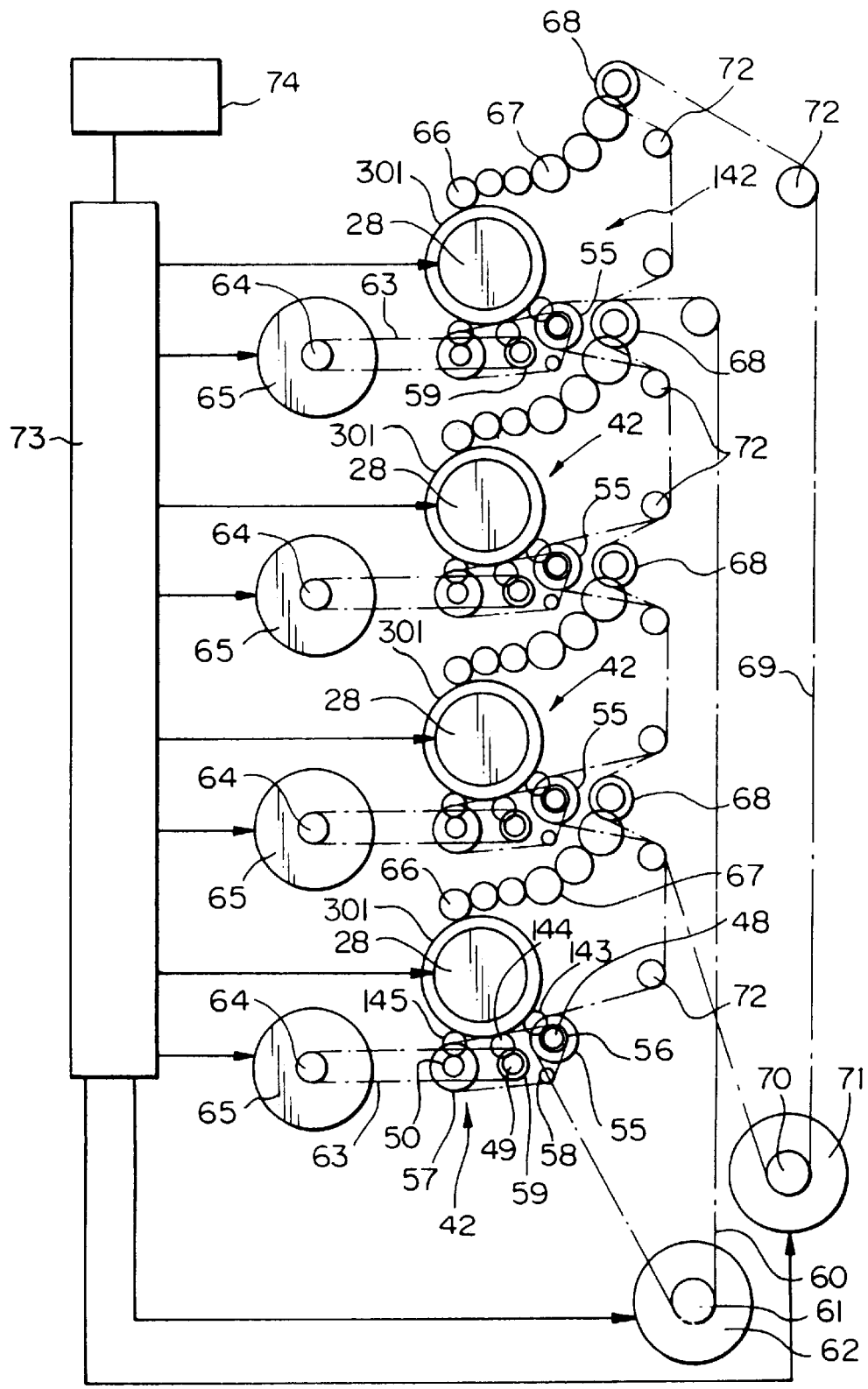
FIG. 24 shows how a plurality of drive transmission devices are each assigned to a particular photoconductive drum in the fourth embodiment.

FIGS. 23 and 24 show a fourth embodiment of the present invention similar to the third embodiment except for the following. The same or similar structural elements as or to the elements of the third embodiment are designated by identical reference numerals, and a detailed description thereof will not be made in order to avoid redundancy. The developing section 6 has the developing roller 200, reverse roller 121 and electric field roller 22, as in the third embodiment. This embodiment includes a drive transmission device 142 for transmitting the rotation of a drive source to the rollers 20–22.

FIG. 23 shows one photoconductive drum 301 and one developing section 6 assigned to the drum 301. As shown, gears 143, 144 and 145 are affixed to the ends of the developing roller 20, reverse roller 121, and electric field roller 122, respectively. A bracket 47 is fixedly connected to the base 30 of the drive unit 222 via a plurality of studs 32. Intermediate gears 48, 49 and 50 are respectively mounted on drive shafts 51, 52 and 53 and held in mesh with the gears 143, 144 and 145. The drive shafts 51–53 are supported by the bracket 47 and base 30 via bearings 54. Pulleys 55 and 56 are mounted on the drive shaft 51 while a pulley 57 is mounted on the drive shaft 53. A timing belt 58 is passed over the pulleys or intermediate pulleys 56 and 57. A reverse pulley 59 is mounted on the drive shaft 52.

As shown in FIG. 24, the drive transmission devices 142 respectively assigned to the drums 301 have their pulleys 55 connected to a single drive motor 62 by a timing belt 60 and a drive pulley 61. The reverse pulley 59 of each drive transmission device 142 is connected to a respective reverse roller motor 65 by a timing belt 63 and a drive pulley 64.

As also shown in FIG. 24, a plurality of cleaning rollers 66 rotatable integrally with the respective cleaning roller 9 are connected to a cleaning roller pulley 68 by a gear train 67. The cleaning roller pulleys 68 are connected to a single cleaning motor 71 by a timing belt 69 and a drive pulley 70. The timing belts 60 and 69 each moves along a particular path defined by a plurality of idler pulleys 72. A controller 73 is connected to an operation panel 74 and controls the operations of the developing motor 62, reverse roller motor 65, and cleaning motor 71.

In operation, the rotation of the developing motor 62 is transmitted to the pulleys 55 with the result that the developing rollers 20 are caused to rotate. The rotation of each drive shaft 51 is transferred to the associated drive shaft 53 via the intermediate pulleys 56 and 57 and timing, belt 58, causing the electric field roller 22 to rotate. When any one of the reverse roller motors 65 is rotated, its rotation is transferred to the reverser pulley 59 and causes the reverse roller 121 to rotate via the drive shaft 52. When the cleaning motor 71 is rotated, all the cleaning rollers 9 rotate via the cleaning roller pulleys 68.

As stated above, each drive transmission device 142 is supported by the mount 27 and driven by the motors or drive sources 62 and 65 via the rollers or rotatable members 20–22. Therefore, the device 142 can be mounted and dismounted from the rear wall 314a of the apparatus body, using a broad space available at the rear of the apparatus body.

It is to be noted that the drive transmission device 42 is similarly applicable to a developing section (developing roller, toner supply roller, agitator and so forth) using a dry developer.

5th Embodiment

Figure 25:
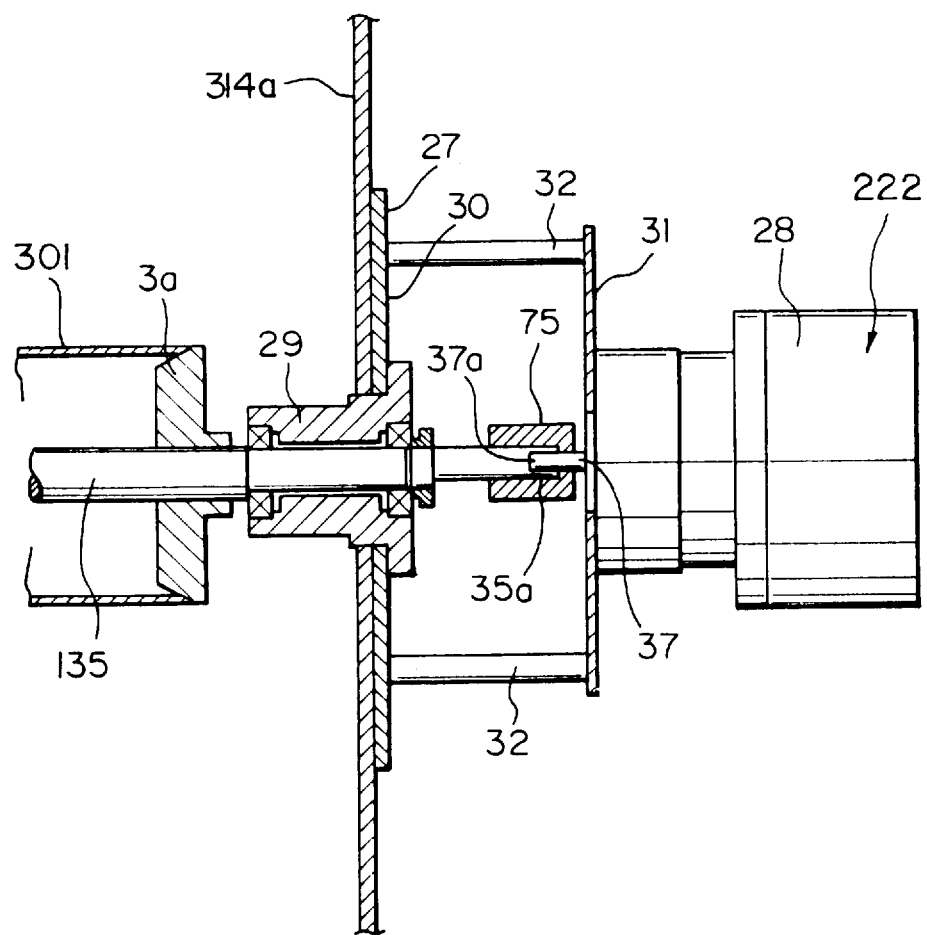
FIG. 25 is a vertically sectioned side elevation showing a drive unit representative of a fifth embodiment of the present invention.

FIG. 25 shows a fifth embodiment of the present invention also similar to the third embodiment. The same or similar structural elements as the elements of the third embodiment are designated by identical reference numerals, and a detailed description thereof will not be made in order to avoid redundancy. As shown, the drum shaft 135 and motor shaft 37 directly connected to the motor 28 are respectively formed with engaging portions 35a and 37a mating coaxially with each other. A coupling member 75 connects the two shafts 135 and 37, as illustrated. This embodiment allows the shafts 37 and 135 to be coaxially connected without resorting to the aligning operation.

6th Embodiment

Figure 26:
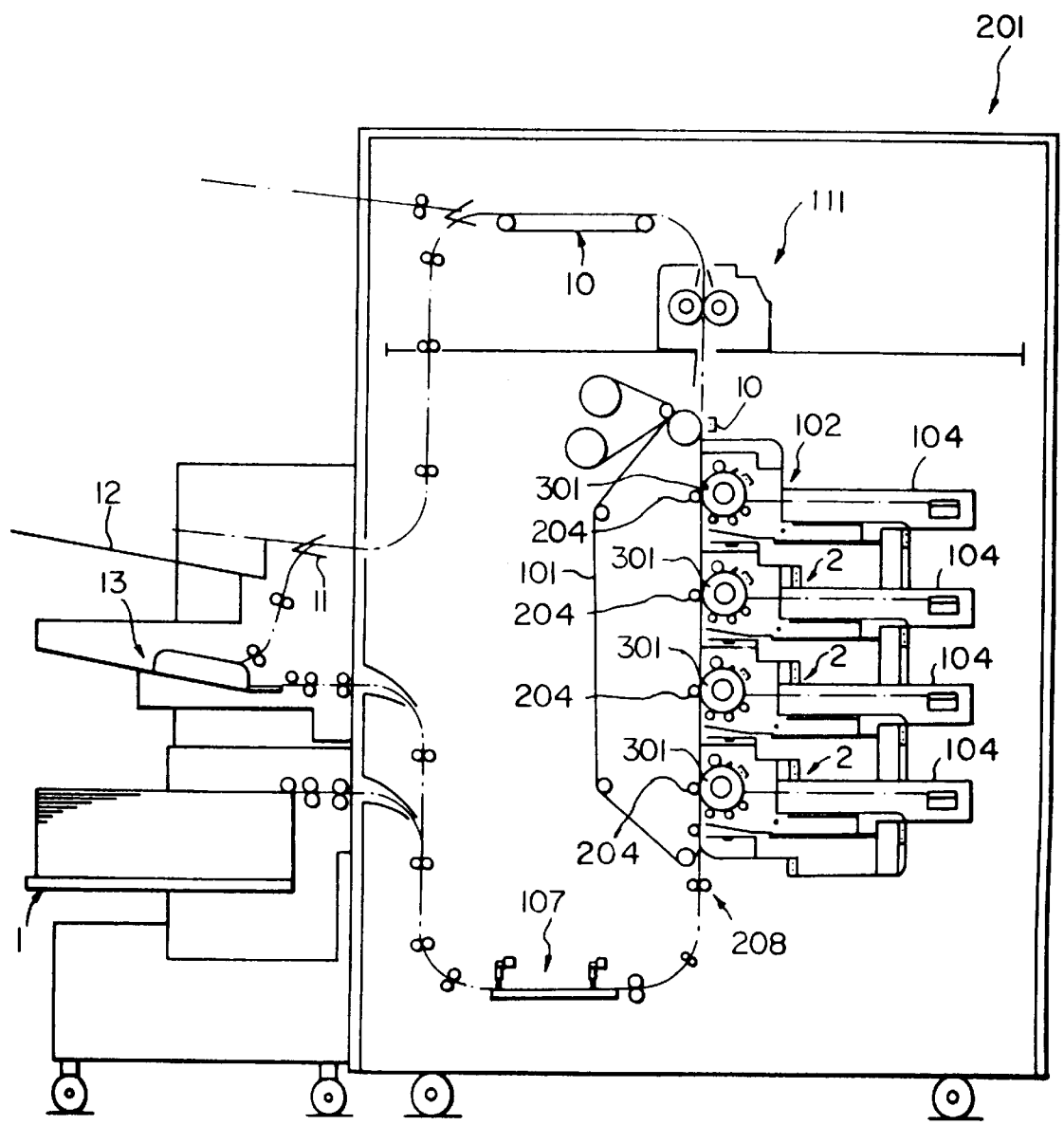
FIG. 26 shows a sixth embodiment of the present invention.

Referring to FIGS. 26–29, a sixth embodiment of the present invention will be described. As shown in FIG. 26, an image forming apparatus, generally 201, has a plurality of image forming units or process units 102. The process units 102 are sequentially arranged along a transfer belt 101 which conveys a sheet or recording medium by electrostatically retaining it thereon. Each process unit 102 is provided with a respective optical writing unit 104 so as to perform the conventional electrophotographic image forming process. The process unit 102 includes a photoconductive element in the form of a drum 301. In the illustrative embodiment, the process units 102 can be individually pulled out of the apparatus 201 and inserted into the same in the axial direction of the drums 301. A developing device included in each process unit 102 stores a developing liquid, i.e., toner of particular color dispersed in Isoper or similar liquid.

The apparatus 201 includes an arrangement for transferring a toner image formed by each process unit 102 to a sheet. A sheet is fed from a sheet feed unit 1 mounted on the body of the apparatus 201 toward a sheet transport path defined by the process units 102 and the transfer belt or conveyor belt 101. The sheet 7 fed from the sheet feed unit 6 is adjusted in horizontal or widthwise position by a horizontal registration unit 107, and then conveyed by way of a leading edge registration sensor 208. Each process unit 102 executes its image forming procedure on the basis of the output of the registration sensor 208, forming a toner image on the respective photoconductive drum 301.

The sheet moved away from the registration sensor 208 is electrostatically retained by the conveyor belt 101. The conveyor belt 101 sequentially conveys the sheet along the sheet transport path. As the sheet sequentially faces the drums 301 of the consecutive process units 102, toner images are sequentially transferred from the drums 301 to the sheet one above the other. The image transfer is effected by biases applied to transfer rollers 204. The transfer rollers 204 respectively face the drums 301 with the intermediary of the belt 101, as illustrated.

A separation charger 10 separates the sheet carrying the image thereon from the conveyor belt 101. Then, a fixing unit 111 fixes the image on the sheet by applying heat and pressure to the sheet. The sheet with the fixed image is driven toward a conveyor unit 10. A path selector or guide 11 is operated to select either a tray 12 or a duplex unit 13. When the path selector 11 selects the duplex unit 13, the sheet carrying the image on one side thereof is switched back toward the duplex unit 13. After several sheets have been stacked on the duplex unit 13, they are sequentially refed toward the registration sensor 208.

Figure 27:
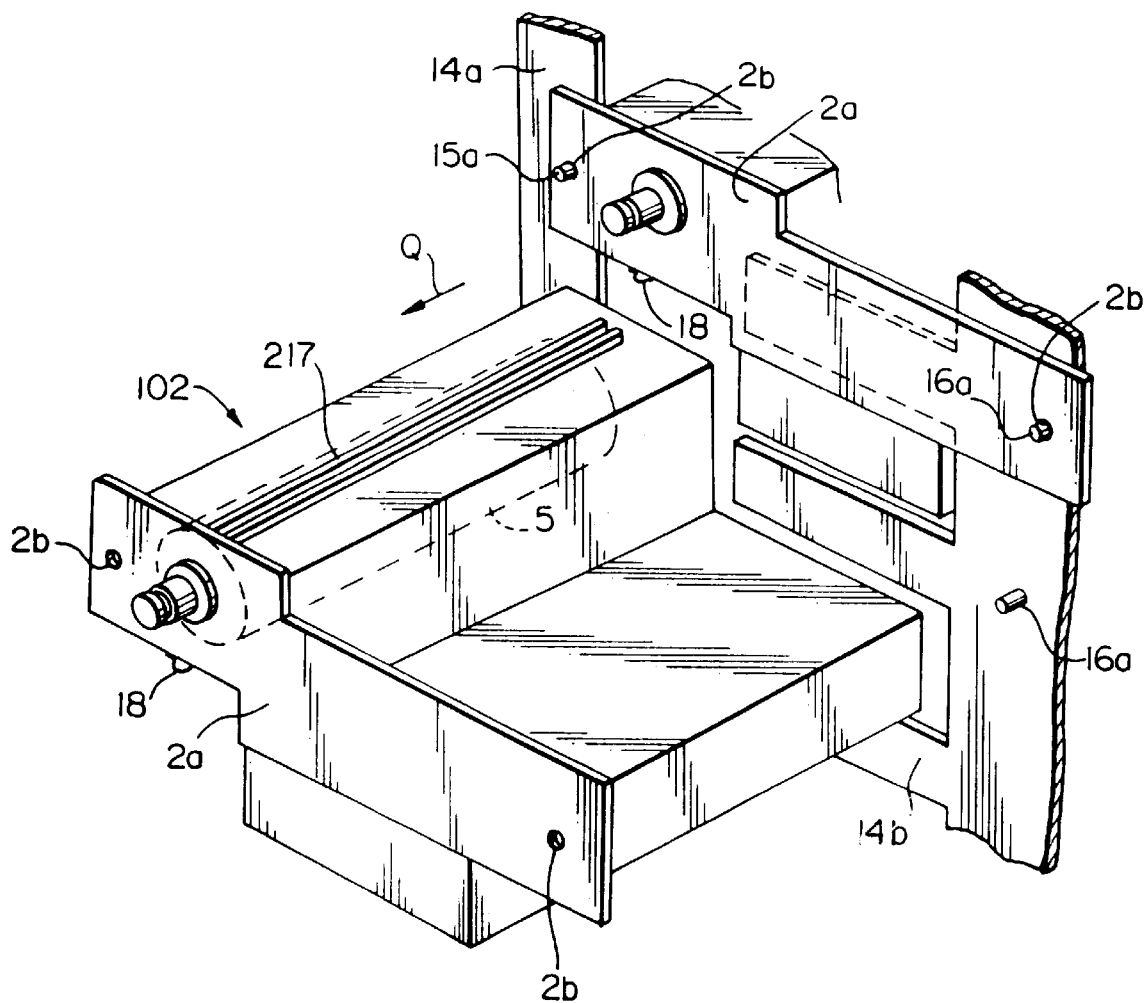
FIG. 27 is a fragmentary perspective view showing how an image forming unit included in the sixth embodiment is pulled out.

As shown in FIG. 27, each process unit 102 is capable of being pulled out and inserted into the apparatus body in the axial direction of the drum 301, as desired. An end wall 2a is mounted on one end of the process unit 102 with respect to the axial direction of the drum 301. The end wall 2a is supported by support members 14a and 14b included in the apparatus body. The end wall 2a is located at the front in the direction in which the process unit 102 is pulled out (arrow Q, FIG. 27), and in this sense referred to as a front wall hereinafter.

The support members 14a and 14b are formed with an opening for receiving the process unit 102. When the process unit 102 is inserted into the apparatus body, the front wall 2a abuts against the support members 14a and 14b, serving to position the process unit 102 at the same time.

The support members 14a and 14b and front wall 2a of the process unit 102 are provided with a structure for positioning the process unit 102 in its inserted position. The structure is implemented by holes 2b formed in the front wall 2a and pins 15a and 16a respectively studded on the support members 14a and 14b. In FIG. 27, the pins 15a and 16b mating with the holes 2b of the overlying process unit 102 are shown.

As shown in FIG. 27, the process unit 102 has guide rails 217 and 218 on its top and bottom, respectively. The guide rails 217 and 218 are coincident with each other, as seen in a plan view, and each extends in the direction in which the process unit 102 is movable. The top guide rail 217 is implemented as a channel while the bottom guide rail 218 is implemented as a ridge complementary in cross-section to the top guide rail 217.

The guide rails 217 and 218 serve as guides for allowing the process units 102 to be individually moved into and out of the apparatus body. Specifically, as shown in FIG. 27, the process unit 102 has a stepped configuration, as seen in an elevation, because the drum 301 is so located to face the optical writing unit 104, FIG. 26. In this condition, the portion of the process unit 102 accommodating the drum 301 is apt to tilt due to the uneven weight distribution. This would prevent the process unit 102 from being stably moved into and out of the apparatus body. In light of this, in this embodiment, the guide rails 217 and 218 of nearby process units 102 mate with each other so as to insure the smooth movement of the units 102.

Figure 28:
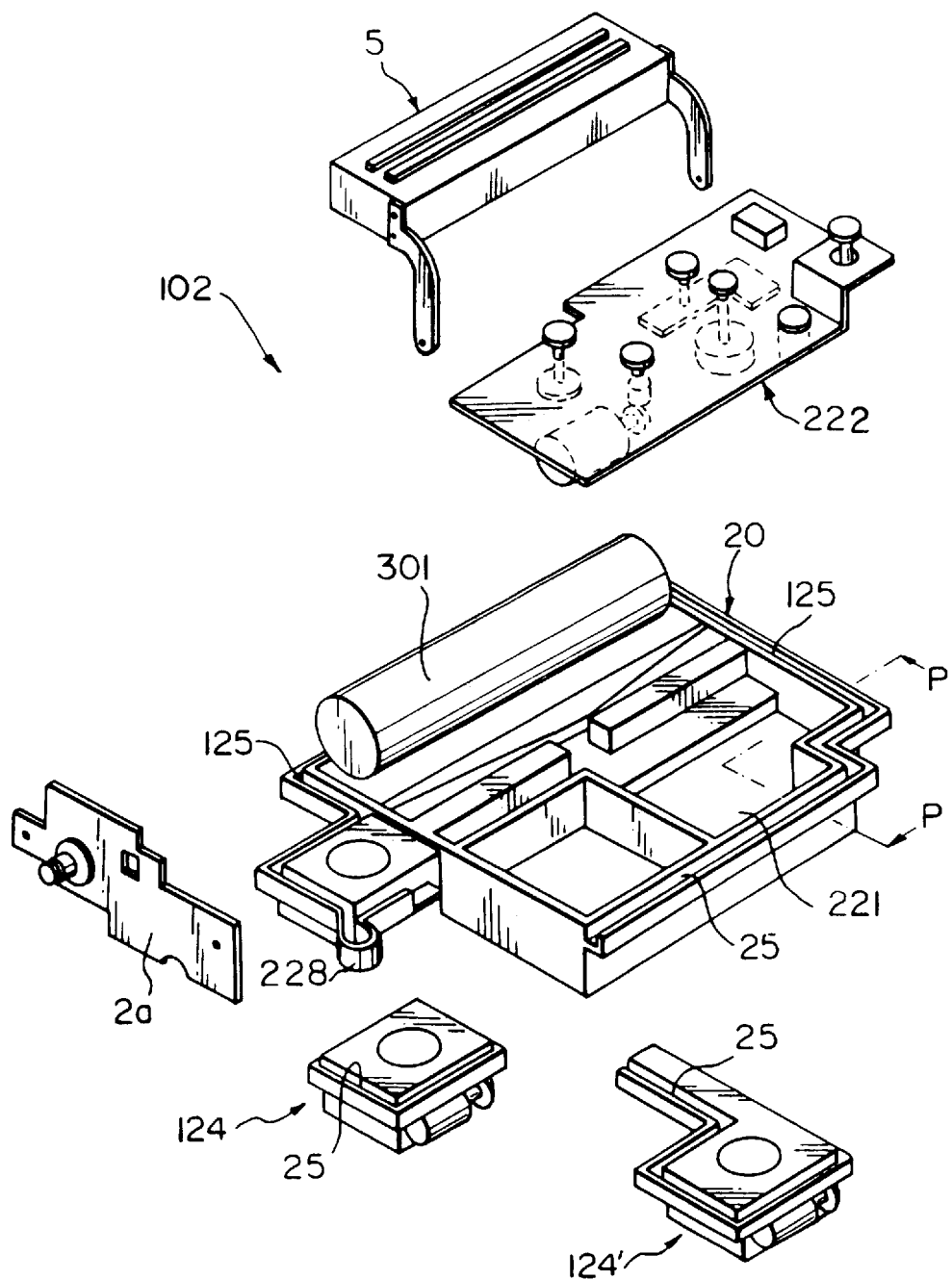
FIG. 28 is an exploded perspective view of the image forming unit of the sixth embodiment.

FIG. 28 shows the structure of each process unit 102 specifically. As shown, the process unit 102 has a unit casing including the portion for accommodating the drum 301 and a developing tank 221. Mounted on the unit casing 102 are an agitator and other drive members protruding into the developing tank 221, the drive unit 222 on which the drive members are mounted, and a cleaning device 5 for cleaning the drum 301.

The drum 301 is rotatably supported by the front wall 2a of the process unit 102. Auxiliary tanks 124 and 124' are selectively connectable to the developing tank 221 for replenishing toner. The auxiliary tanks or subtanks 124 and 124' each has a toner replenishing path having a particular length, so that they will not interfere with each other when connected to the developing tanks 221 of the process units 102. An arrangement for allowing the process unit 102 to support the drum 301 will be described specifically later.

Figure 29:
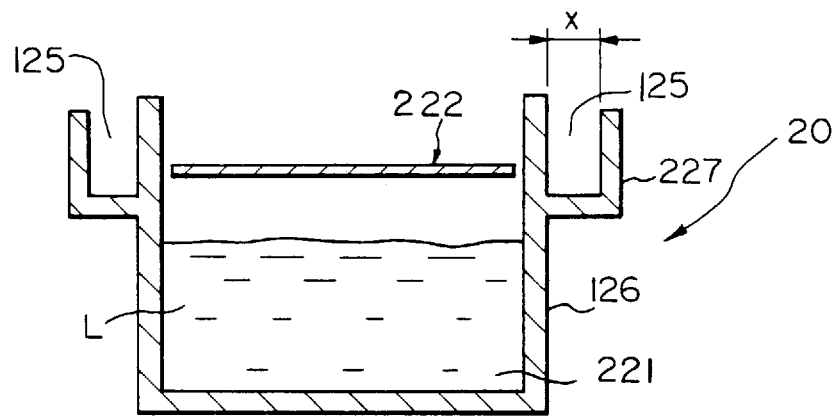
FIG. 29 is a section along line P—P of FIG. 28.

A channel 125, characterizing this embodiment, is formed in the vicinity of the upper end of the developing tank 221. The channel 125 will be described in detail with reference to FIG. 29. As shown, the channel 125 is positioned in the vicinity of the upper ends of side walls 126 included in the unit casing 20. Specifically, contiguous walls 127 surround the side walls 126 of the casing 20 and have their bottoms configured integrally with the walls 126, the upper end of the channel 125 is open. Labeled L in FIG. 29 is the developing liquid stored in the tank 21.

The channel 125 extends throughout the side walls 126 of the casing 20. As shown in FIG. 28, the channel 125 is also formed in each of the subtanks 124 and 124', so that the liquid L can flow continuously throughout such channels 125. The path for guiding the overflown liquid L partly terminates at a leak sensing portion 228. In this particular embodiment, the channel 125 has a width (x) ranging from 2 mm to 10 mm. While the liquid L is stored in the tank 221, the channel 5 having the above width can receive a part of the liquid L which may overflow the tank 221.

The sensing portion 28 determines whether or not the liquid received in the channel 125 has reached a preselected amount. When the liquid L in the channel 125 has reached the preselected amount, as determined by the sensing portion 228, an alarm section, not shown, produces an alarm. In the illustrative embodiment, the path formed by the channel 125 is inclined toward the sensing portion 228 in order to promote the flow of the liquid L into the portion 228.

Assume that the surface of the liquid L waves and overflows the tank 221 when the process unit 102 is pulled out of or inserted into the apparatus body. Then, the channel 125 receives the part of the liquid L overflown the tank 221. This part of the liquid L flows along the channel 125 and partly reaches the sensing portion 228. When the sensing portion 228 senses more than the preselected amount of the liquid L, an alarm is produced to inform the operator of the overflow. In response, the operator can discharge the overflown liquid L to the outside of the casing 20.

As stated above, this embodiment prevents the liquid L overflown the tank 221 from leaking to the outside of the casing 20; otherwise, the liquid would smear the portions of the process unit 102 around the tank 221.

7th Embodiment

Figure 30:
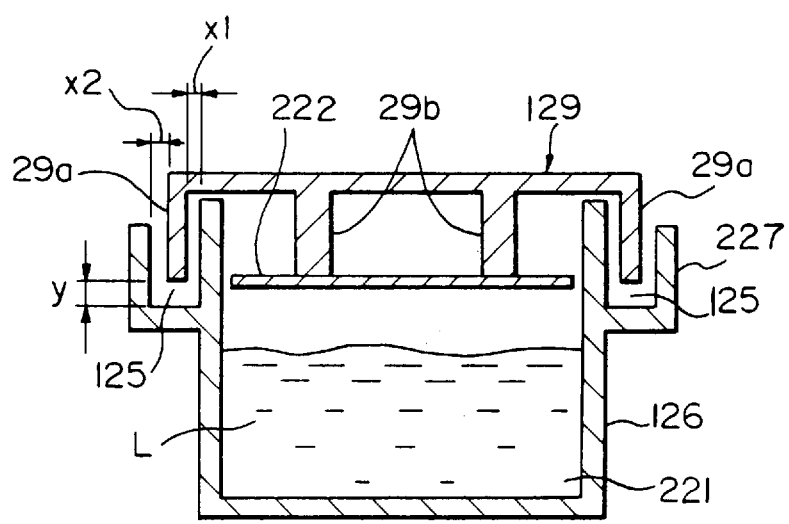
FIG. 30 shows a seventh embodiment of the present invention.

FIG. 30 shows a seventh embodiment of the present invention similar to the sixth embodiment except for the following. As shown, a cover 129 covers the top of the developing tank 221. The edges of the cover 129 are bent downward to form a leg 29a extending into the channel 125. The leg 29a is spaced from the side walls 126 by a gap x1 and from the walls 27 by a gap x2. The lower end of the leg 29a is spaced from the bottom of the channel 125 by a gap y. In this condition, the leg 29a is positioned without contacting the inner periphery of the channel 125. This configuration is significant for the following reason.

Assume that the leg 29a contacts the inner periphery, i.e., the sides and bottom of the channel 125. Then, the liquid L overflown the tank 221 deposits on the surfaces of the leg 29a due to capillarity. As a result, when the cover 129 is lifted, the liquid L drops from the surfaces of the leg 29a and smears the portions around the tank 221. In addition, the liquid L deposited on the leg 29a is apt to dry and block the path for the overflown liquid L.

Specifically, the gaps x1 and x2 are selected to be about 1 mm to 3 mm in the horizontal direction while the gap y is selected to be about 2 mm to 10 mm, on the assumption that the cover 129 is 2 mm thick. This insures the flow of the overflown liquid L in the channel 125 while preventing the leg 29a from contacting the liquid L.

Support legs 29b extend downward from the underside of the cover 129 and rest on the drive unit 22 above the surface of the liquid L existing in the tank 221. The support legs 29b are affixed by the drive unit 22 and held in the above position in the channel 125 thereby.

As stated above, the liquid L overflown the tank 221 impinges on the leg 29a of the cover 29a and drops into the channel 125. This prevents the liquid L from being scattered around more positively.

8th Embodiment

Figure 31:
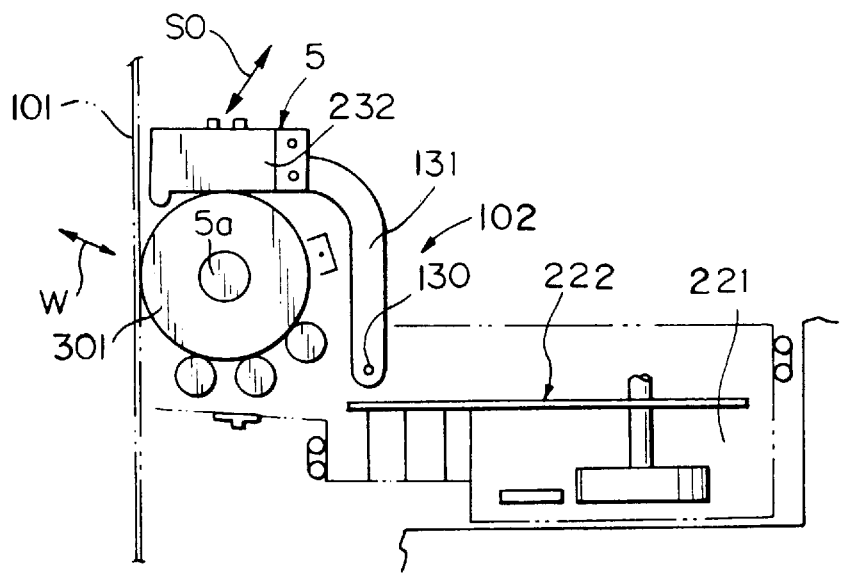
FIG. 31 shows a cleaning device representative of an eighth embodiment of the present invention.

FIG. 31 shows an eighth embodiment of the present invention. As shown, the drum 301 accommodated in the process unit 102 is positioned closer to the belt 101 than the developing tank 221 so as to face the transfer belt 101. The cleaning device 5, FIG. 28, is movable into and out of contact with the drum 301. On contacting the drum 301, the cleaning device 5 removes toner left on the drum 301 after the image transfer. The cleaning device 5 has a shaft 130, a support arm 131, and a cleaning member 232. The shaft 130 is positioned at the opposite side to the belt 101 with respect to the drum 301 and below the shaft 5a of the drum 301. The support arm 131 has its one end rotatably supported by the shaft 130, and extends from the shaft 130 at the side opposite to the belt 101 with respect to the drum 301, as illustrated. The cleaning member 232 is mounted on the other end of the support arm 131.

The support arm 131 is rotatable about the shaft 130 in the direction indicated by an arrow SO in FIG. 31. When the arm 131 is rotated clockwise, as viewed in FIG. 31, the cleaning member 232 is released from the drum 301. When the arm 131 is rotated counterclockwise, the cleaning member 232 is brought into contact with the drum 301.

Figure 32:
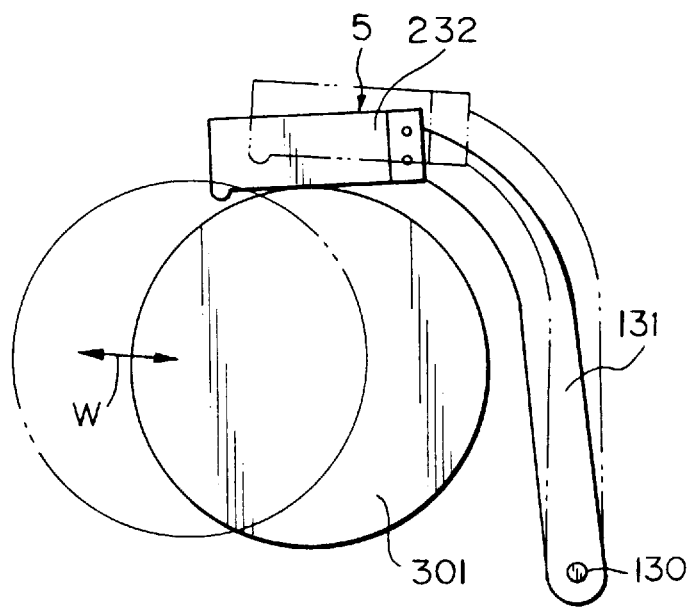
FIG. 32 shows the operation of the cleaning device shown in FIG. 31.

In this embodiment, the cleaning member 232 is rotatable about a fulcrum which is not provided on the cleaning member 232 itself, but provided at the outside of the member 232. Assume that the support arm 131 is so rotated as to move the cleaning member 232 away from the drum 301, as shown in FIG. 32. Then, the cleaning member 232 can move away from the drum 301 with a smaller inclination than when it has the fulcrum on itself. Therefore, when the liquid collected from the drum 301 remains in the cleaning member 232, it is prevented from dropping due to an excessive inclination.

After the cleaning device 523 has been released from the drum 301, the drum 301 may be removed via the side where it faces the belt 101, as indicated by an arrow W in FIG. 32. This can be done without any interference because the side of the process unit 102 facing the belt 101 is simply open for exposing the drum 301 to the outside.

9th Embodiment

Figure 33:
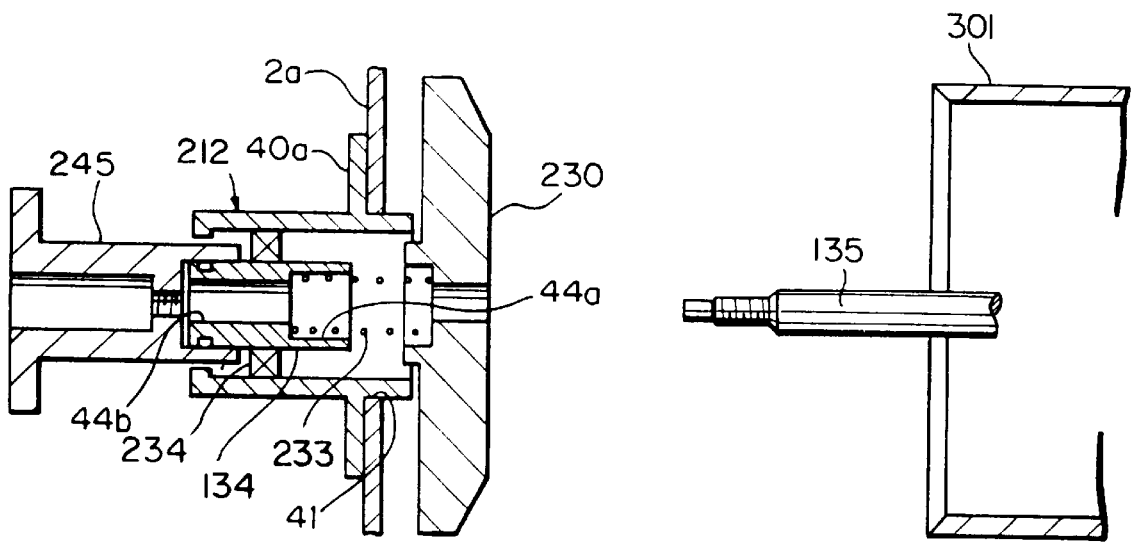
FIG. 33 is a section showing a drum support structure representative of a ninth embodiment of the present invention.

FIG. 33 shows a ninth embodiment of the present invention similar to the conventional configuration shown in FIG. 3 except for the following. As shown, the side wall 2a of the process unit 102 is formed with a hole 41 for receiving a slide guide 212. The slide guide 212 is a hollow cylindrical member including a flange 40a to be connected to the side wall 2a. A bearing 234 is affixed to the inner periphery of the slide guide 212. A spring retainer 134 is received in the bearing 234. A spring 233 is seated on a flange 230 at one end and inserted in the spring retainer 134 at the other end. Specifically, the spring retainer 134 has an axial bore 44a at its end facing the flange 230. The flange 230 has a boss portion on its end opposite to the drum 301. The spring 233 is received in the bore 44a and boss portion at its opposite ends.

A bore 44b contiguous with the bore 44a extends throughout the spring retainer 134. A nut member 245 is affixed to the end of the spring retainer 134 opposite to the bore 44a. In this condition, the spring retainer 134 and nut member 245 through which a drive shaft 135 is to be passed have their axes aligned via the slide guide 212. The nut member 245 is formed with a female screw portion coaxial with the bore 44b of the spring retainer 134. The drive shaft 135 has a male screw portion at its end and can have it driven into the female screw portion of the nut member 245.

To set the process unit 102 in the apparatus body, the flange 230 is mounted to the side wall 2a of the process unit 102 by using the drive shaft 135 of the apparatus body as a reference. To couple the flange 230 over the drive shaft 135, the flange 230 is held at the end of the slide guide 212 mounted on the side wall 2a, and then located to face the drive shaft 135 together with the side wall 2a.

Figure 34:
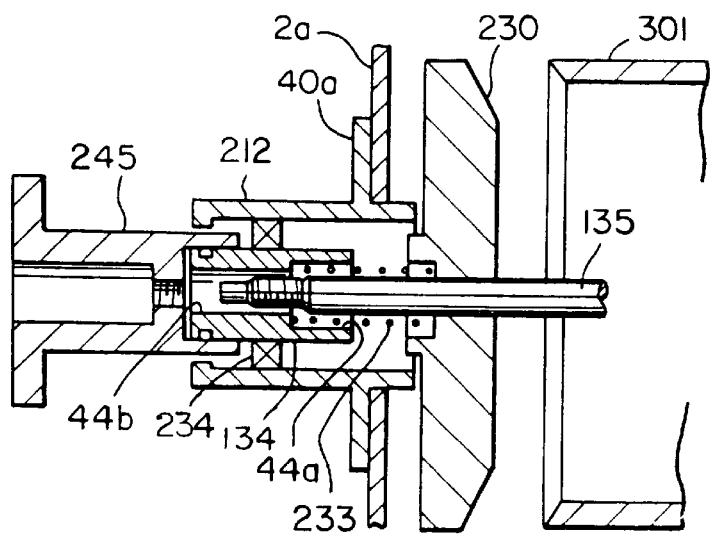
FIGS. 34, 35 and 36 are sections each showing a photoconductive drum and the support structure of FIG. 33 in a particular condition.
Figure 35:
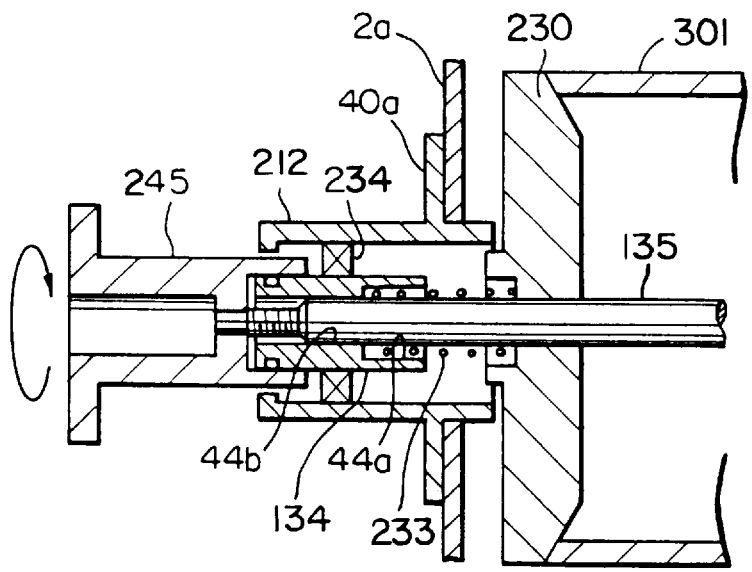

As shown in FIG. 34, after the drive shaft 135 has been passed through the flange 230, the process unit 102 is pressed toward the drive shaft 135. As a result, the drive shaft 135 is passed through the spring 233 until its end has been received in the bore 44b of the spring retainer 134. Subsequently, as shown in FIG. 35, the nut member 245 is rotated to cause the female screw portion to mate with the male screw portion of the drive shaft 135. As the female screw portion advances along the male screw portion, the nut member 245 also advances in the axial direction of the drive shaft 135 which is unmovable in the axial direction. Consequently, the spring retainer 134 and bearing 234 fitted therein move in the same direction as the nut member 245 within the slide guide 212.

Figure 36:
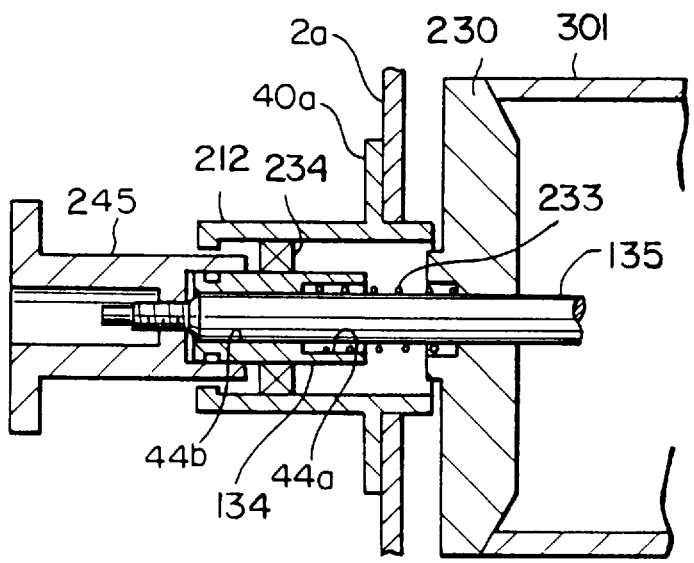

The nut member 245 stops moving when the male screw portion of the drive shaft 135 entirely mates with the female screw portion, i.e., when the end of the male screw portion abuts against the nut member 245, as shown in FIG. 36. In this condition, the spring 233 compressed during the movement of the nut member 245 resiliently presses the flange 230 against the end face of the drum 301.

As stated above, in this embodiment, the side wall 2a of the process unit 102 is coupled over the drive shaft 135, and then the drive shaft 135 is inserted into the slide guide 212 mounted on the side wall 2a. Such a simple procedure allows the drive shaft 135 to be supported by the side wall 2a.

10th Embodiment

Figure 37A:
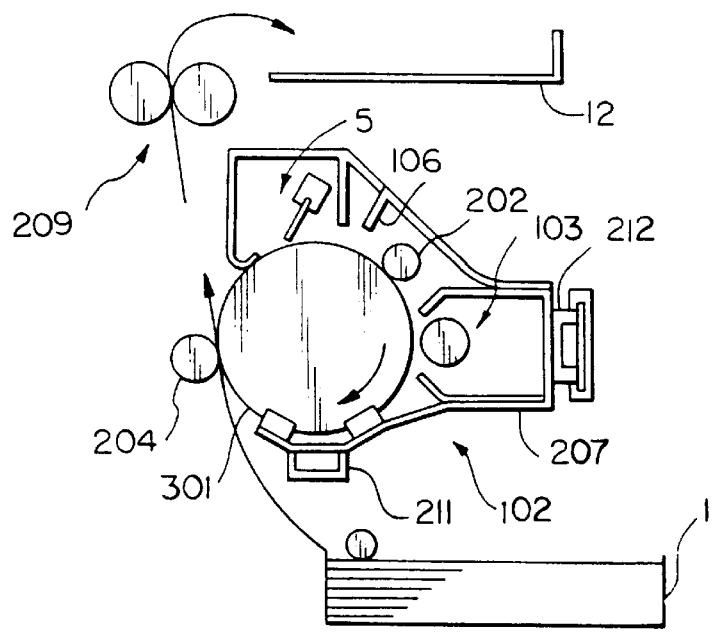
FIG. 37A is a fragmentary front view of a printer representative of a tenth embodiment of the present invention.

This embodiment is applied to an electrophotographic printer. As shown in FIG. 37A, the printer includes a rotatable photoconductive element or image carrier 301 implemented as a drum. Arranged around the drum 301 are a charge roller or charging means 202, a developing device 103, a transfer roller or transferring means 204, a cleaning device 5, and a discharger 106. The charger roller 202, developing device 103, cleaning device 5 and discharger 106 are accommodated in a single casing 207, constituting an image forming unit 102. A cassette 1 loaded with a stack of sheets is located below the drum 301. A fixing roller pair 209 and a tray 12 for receiving printings are disposed above the drum 301. The printer forms a toner image on the drum by a conventional electrophotographic process, and causes the transfer roller 204 to transfer the toner image to a sheet fed from the cassette 1. The sheet has the toner image fixed thereon by the fixing roller pair 209 and then driven out to the tray 12.

Slide guides 211 and 212 are mounted on the casing 207 in order to allow the casing 207 to be slid into and out of the apparatus body in the axial direction of the drum 301. FIG. 37 shows the apparatus body, labeled 314, in a condition wherein a front cover 315 is opened, and the image forming unit 102 is pulled out of the apparatus body 314. As shown, the slide guide 212 is implemented as a telescopic slide guide slidable on a slide guide affixed to the apparatus body. A knob 116 protrudes from the front of the image forming unit 102. When the unit 102 is pulled out of or inserted into the apparatus body 314, the knob 116 is operated in order to lock or unlock the unit 102 to or from the apparatus body 314.

Figure 37B:
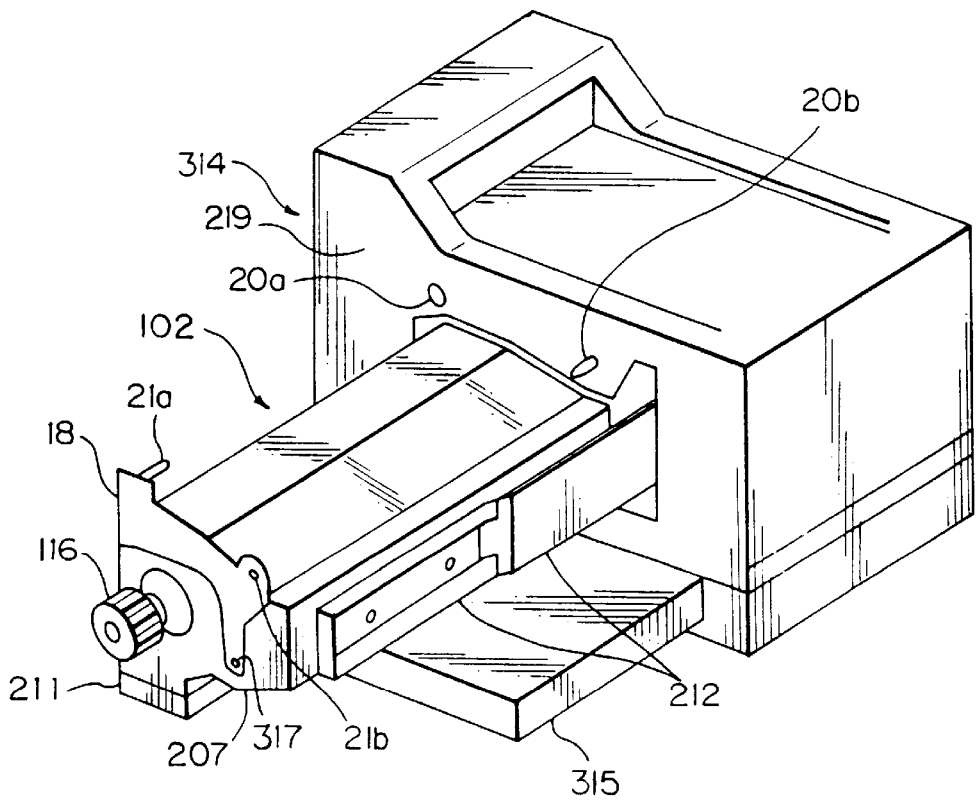
FIG. 37B is an external perspective view of the tenth embodiment.
Figure 38A:
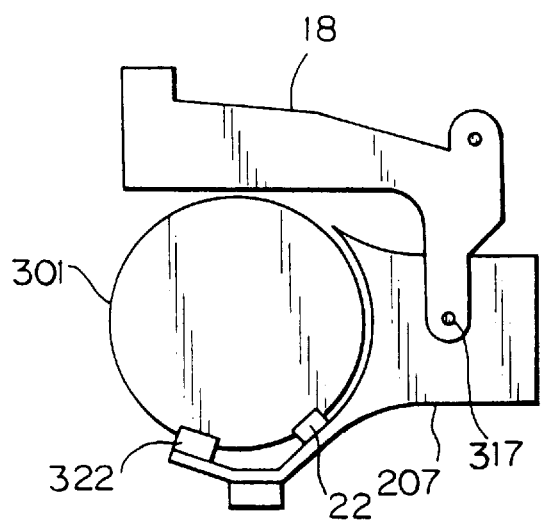
FIGS. 38A and 38B each shows an arm included in the tenth embodiment in a particular position.
Figure 38B:
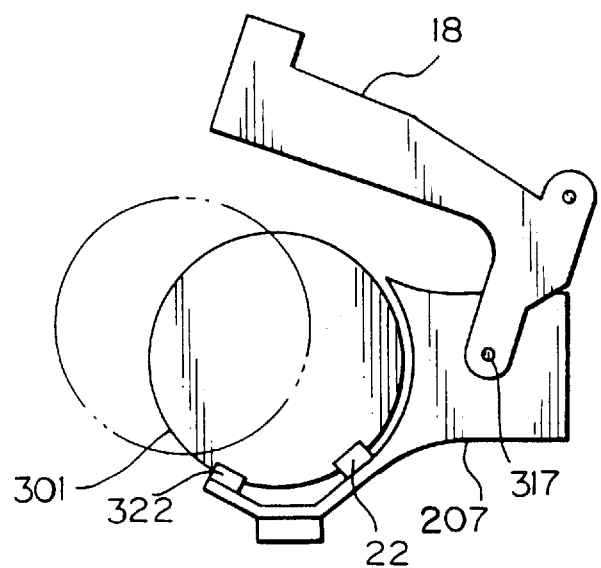

As shown in FIG. 37B, an arm 18 is pivotable about a pin 317 studded on the front end of the image forming unit 102 with respect to the direction in which the unit 102 is movable into and out of the apparatus body 314. Another arm 18 is pivotable about a pin 317 studded on the rear end of the image forming unit 102, although not visible in FIG. 37B. As shown in FIGS. 38A and 38B, the arms 18 are movable toward and away from the drum 301. The arms 18 support the structural section or sections of the image forming unit 102 which would obstruct the drum 301 in the event of removal of the drum 301, e.g., only the cleaning device 5 or the cleaning device 5, discharger 106 and charge roller 202, as will be described specifically later. As shown in FIGS. 38B, the arms 18 can be locked to the casing 207 in its position remotest from the drum 301 by means of a screw, pin or the like. As shown in FIG. 37B, the image forming unit 102 is provided with a pin 21a and a hole 21b. When the unit 102 is fully inserted into the apparatus body 314, the pin 21a and hole 21b respectively mate with a hole 20a and a pin 20b provided on the front wall 219 of the apparatus body 314, positioning the unit 102 relative to the apparatus body 314.

The illustrative embodiment further includes the following arrangements for reducing the parts of the drum 301 needing replacement, and for allowing the operator to easily pull the image forming unit 102 out of the apparatus body 314 for the replacement of the drum 301.

Figure 39A:
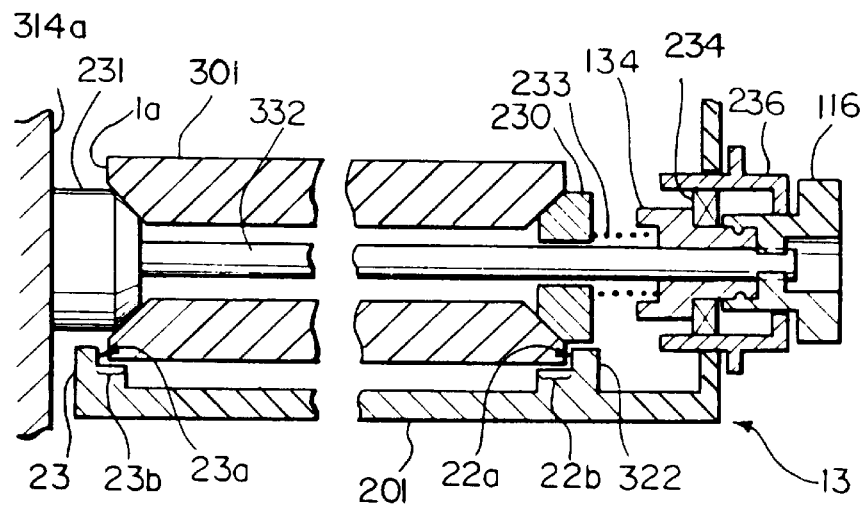
FIGS. 39A, 39B and 39C each shows a process unit included in the tenth embodiment in a particular condition.
Figure 39B:
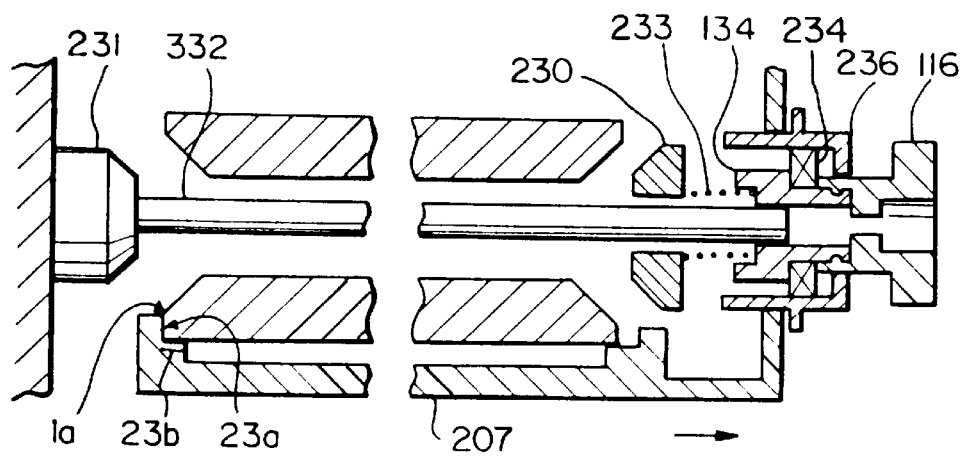
Figure 39C:
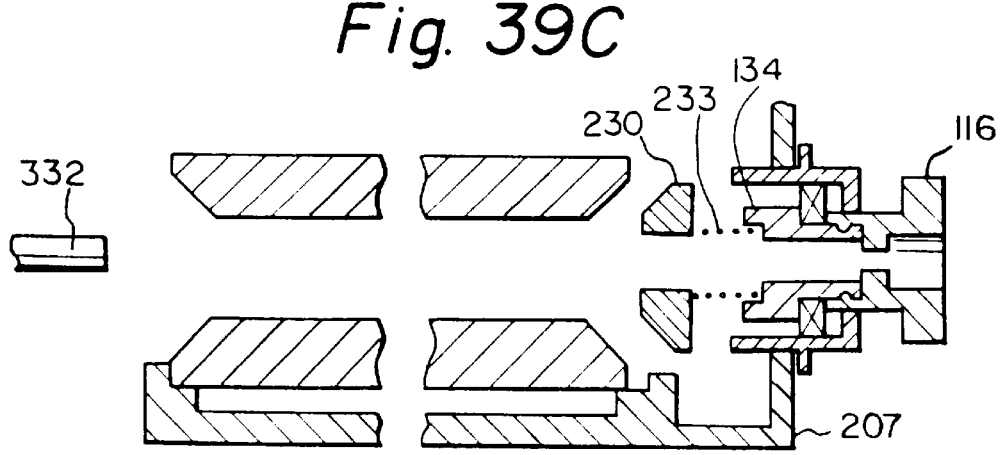

The image forming unit 102 is shown in FIG. 39A in its position set in the apparatus body 314, shown in FIG. 39B in its position pulled halfway out of the apparatus body 314, and shown in FIG. 39C in its position fully pulled out of the apparatus body 314. As shown, the drum 301 is implemented as a hollow cylinder or sleeve open at both ends thereof. The drum 301 is made up of a conductive base and a photoconductive layer formed on the base. Flanges 230 and 231 are respectively positioned in the apparatus body 314 at the front and the rear of the sleeve 301. A rotary drive shaft 332 extends from the rear wall 314a of the apparatus body 314 to the front wall of the same. The rear flange 231 is affixed to the drive shaft 332 and used to hold the rear end of the sleeve 301. The front flange 230 is mounted on the drive shaft 332 extending throughout the sleeve 301, and is movable in the thrust direction. In the illustrative embodiment, the flanges 230 and 231 are each tapered so as to be surely positioned relative to the open ends of the sleeve 301 in the thrust direction.

A spring 233 and a spring seat 134 are mounted on the drive shaft 332 in front of the front flange 230 in such a manner as to be movable in the thrust direction. The spring 233 is anchored to the flange 230 and spring seat 134 and constantly biases the flange 230 toward the drum 301. A ball bearing 234 is press fitted on the outer periphery of the spring seat 134. The knob 16 is rotatably mounted on the spring seat 134 by an annular lug and recess scheme. The knob 116 has a bore capable of receiving the end of the drive shaft 332 and threaded to mate with a thread formed on the outer periphery of the end of the shaft 332. A bearing seat 236 guides the movement of the ball bearing 234 in the thrust direction. The spring seat 134 and bearing seat 236 are mounted on the front wall of the casing 207 while covering the ball bearing 234.

Lugs 322 and 323 extend from the inner surface of the bottom portion of the casing 207, and correspond in position to the front and rear ends of the drum 301. The rear lug 323 includes a shoulder or abutment 23a facing the rear end 1a of the drum 301 from the rear side of the apparatus body 314, and a shoulder or seat 23b facing the outer periphery of the drum 301. Likewise, the front lug 322 includes a shoulder 22a facing the front end of the drum 301 from the front side of the apparatus body 314, and a shoulder 22b facing the outer periphery of the drum 301. When the image forming unit 102 is pulled out or inserted into the apparatus body 314, the shoulder 23a or 22a abuts against the rear end or the front end of the drum 301. The shoulders or seats 22b and 23b cooperate to sustain the drum 301 when the drum 301 is released from the flanges 230 and 231. The shoulders 22a, 22b, 23a and 23b are so dimensioned as not to contact the flanges 230 and 231 or drum 301 when the image forming unit 102 is set on the apparatus body 314.

In the condition shown in FIG. 39A, the knob 116 has its screw held in engagement with the screw of the drive shaft 332 while the spring 233 biases the front flange 230 toward the rear of the apparatus body 314. The force of the spring 233 holds the front flange 230 in tight contact with the edge of the front opening of the drum 301, and in addition holds the edge of the rear opening of the drum 301 in tight contact with the rear flange 231. When the drive shaft 332 is rotated during image formation, it causes the drum 301 to rotate via the rear flange 231 contacting the tapered end of the drum 301. The drum 301, in turn, causes the flange 230 contacting the front end thereof to rotate. As a result, the spring seat 134 and knob 116 are caused to rotate via the spring 233. The rotation of the front end of the shaft 332 is received by the bearing seat 236 via the ball bearing 234 mounted on the spring seat 134.

To pull the image forming unit 102 out of the apparatus body 314, the knob 116 is turned until its screw has been released from the screw of the drive shaft 332. At this instant, the front flange 230, spring 233, spring seat 134, ball bearing 234 and knob 116 move together in the bearing seat 236 toward the front end of the apparatus body 314 (to the right as viewed in FIGS. 39A–39C). Although the spring 233 slightly extends, the front flange 230 connected to the spring 233 is moved away from the front end of the drum 301. The front portion of the drum 301 falls due to its own weight and rests on the shoulder 22b of the front lug 322.

Figure 40A:
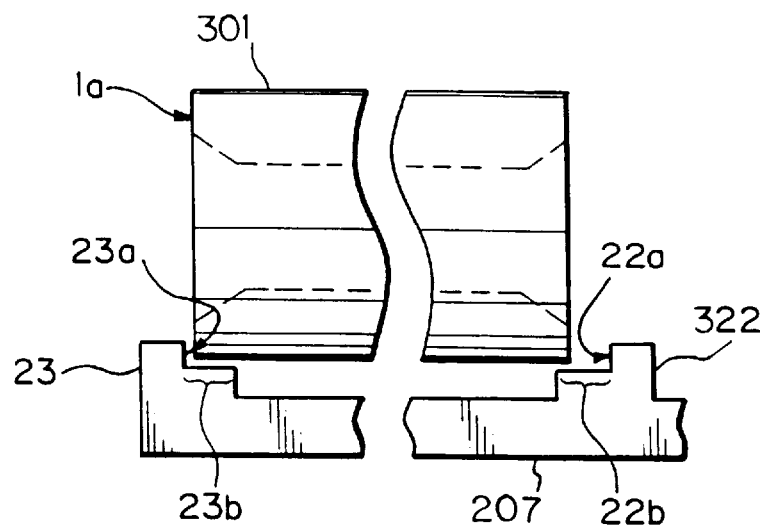
FIGS. 40A and 40B show a mechanism included in the tenth embodiment for mounting and dismounting a photoconductive element.

Subsequently, as shown in FIG. 37B, the image forming unit 102 is pulled out via the slide guides 11 and 12. At this instant, the shoulder 23a of the rear lug 323 abuts against the rear end 1a of the drum 301 and pushes, or hitches, it forward, as shown in FIG. 39B. As a result, the rear end 1a of the drum 301 is released from the rear flange 231, so that the drum 301 is pulled out together with the casing 207 while resting on the shoulder or seat 23b of the lug 323 due to its own weight. This condition is shown in FIG. 40A more specifically.

As shown in FIG. 39C, when the image forming unit 102 is fully pulled out of the apparatus body 314, it is fully released from the drive shaft 332. In this condition, as shown in FIG. 38B, the arms 18 positioned above the drum 301 and supporting the previously mentioned structural sections may be raised to allow the drum 301 to be removed upward. After the removal of the drum 301, it is possible to inspect or clean, e.g., the inside of the developing device 103 having been concealed by the drum 301 or to set a new drum 301. Because the front flange 230 is connected to the spring seat 133 by the spring 233, it is prevented from dropping even when released from the drive shaft 332.

Figure 40B:
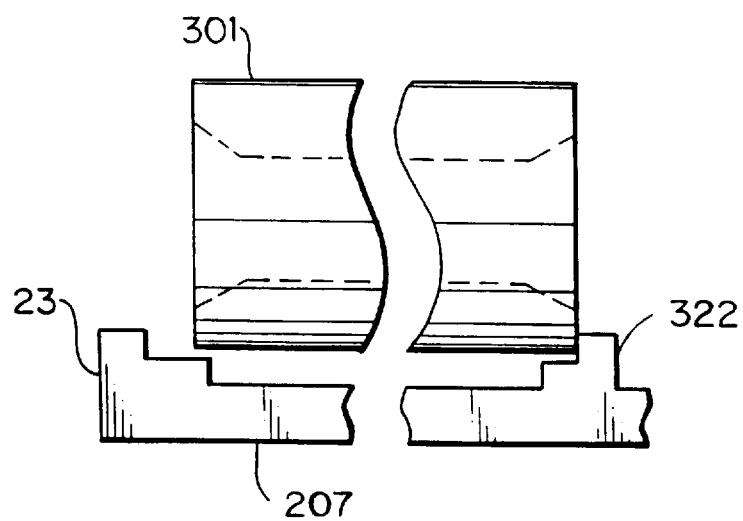

The image forming unit 102 is inserted into the apparatus body 314 by a procedure opposite to the procedure shown in FIGS. 39A–39C. After the insertion, the operator turns the knob 116 to again set up the threaded engagement of the image forming unit 102 and drive shaft 332. In this case, as shown in FIG. 40B, the shoulder 22a of the front lug 322 abuts against and pushes the front end of the drum 301 rearward. Just before the end of the insertion, the rear tapered end of the drum 301 is brought into contact with the tapered portion of the rear flange 231 and lifted thereby. When the knob 116 is turned, the tapered portion of the front flange 230 enters the front end of the drum 301 by being guided by the taper of the drum 301.

When the image forming unit 102 is pulled out or inserted into the apparatus body, the shoulder 23a or 22a abuts against and hitches the end of the drum 301 facing it. If the dimension of the shoulder 22a or 23a for hitching the drum 301 is short, then the end of the drum 301 is apt to get on the drum 322 or 323 due to a shock when the drum 301 drops onto the shoulder 22b or 23b. This would prevent the drum 301 from being pulled out or inserted into the apparatus body 314 together with the image forming unit 102. In the construction shown in FIGS. 37A and 37B, the cleaning device 5 includes a cleaning blade. Because the cleaning blade presses the drum from the above even when the image forming unit 102 is pulled out, it obviates the above problem. However, an apparatus lacking the cleaning blade or similar pressing member has the same problem.

Figure 41A:
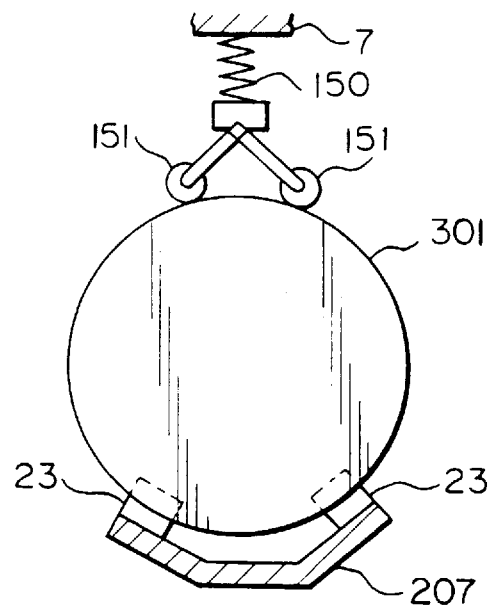
FIGS. 41A and 41B each shows a particular modification of the mechanism shown in FIGS. 40A and 40B.
Figure 41B:
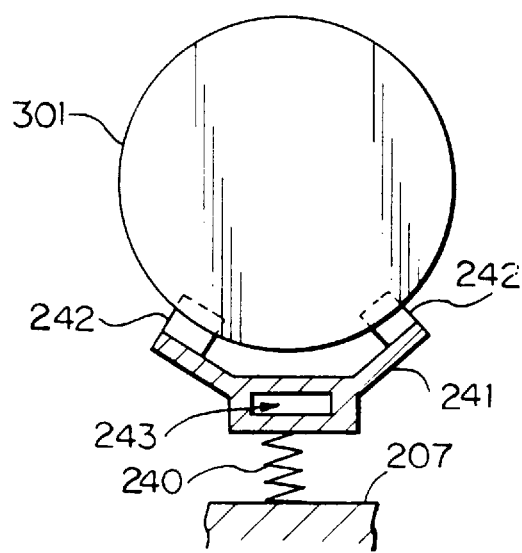

Specific mechanisms for pressing the periphery of the drum 301 against the shoulders or seats 22b and 23b of the casing 207 will be described hereinafter. FIG. 41A shows a bifurcated support member carrying a pair of rollers 151 thereon and constantly biased downward by a spring 150. In this condition, the rollers 151 press the upper portion of the drum 301 downward so as to allow the lugs 322 and 323 (only the lug 323 is shown) to surely hitch the associated ends of the drum 301. FIG. 41B shows a bifurcated member 241 having a pair of portions 242 in place of the lugs 322 and 323. The member 241 is constantly biased upward by a spring 240.

In any one of the configurations shown in FIGS. 41A and 41B, it is preferable that the lugs 322 and 323 be released from the drum 301 during image formation in order to protect the surface of the drum 301 and lugs 322 and 323. A specific arrangement for cancelling the bias acting on the drum 301 when the image forming unit 102 is set on the apparatus body 314 will be described with reference to FIG. 41B. As shown, the bifurcated member 241 is formed with a hole 243. As shown in FIG. 44, a regulating member 44 regulates the above pressure when received in the hole 243 at the time of the insertion of the image forming unit 102.

Figure 42:
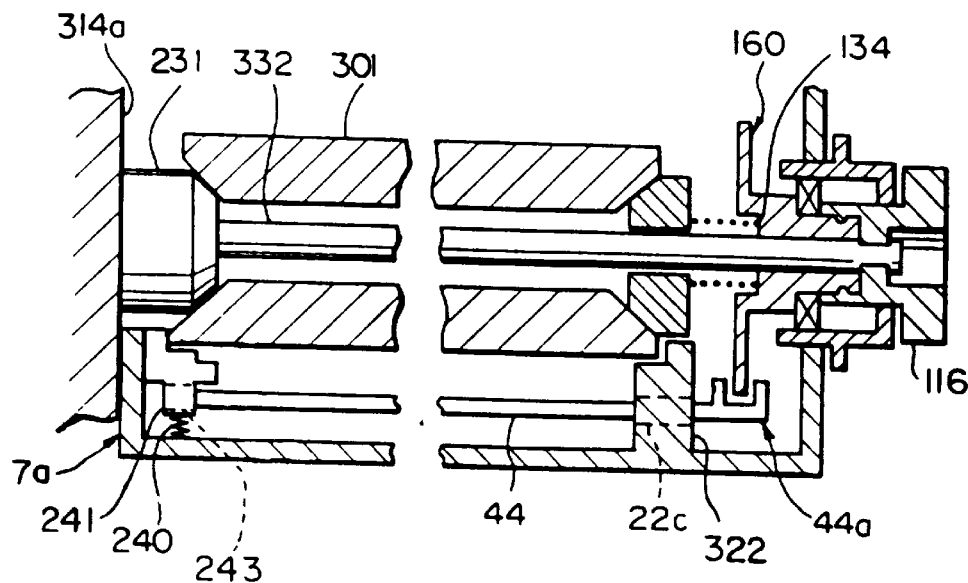
FIG. 42 is a section showing the mechanism of FIG. 41B.

Preferably, an interlocking mechanism or switching means is provided for moving the regulating member 44 between an operative position where the member 44 is received in the hole 243 and an inoperative or retracted position where it is released from the hole 243, in interlocked relation to the movement of the image forming unit 102. A specific interlocking mechanism shown in FIG. 42 moves the regulating member 44 between the above two positions in interlocked relation to the engagement and disengagement of the knob 116 from the drive shaft 332. Specifically, the spring seat 34 includes a flange 160. The member 44 has at its one end a portion 44a facing the opposite surfaces of the flange 160 in the thicknesswise direction of the flange 160. The other end of the member 44 is movable into and out of the hole 243. The member 44 is passed through a hole 22c formed in the front lug 322.

Figure 43A:
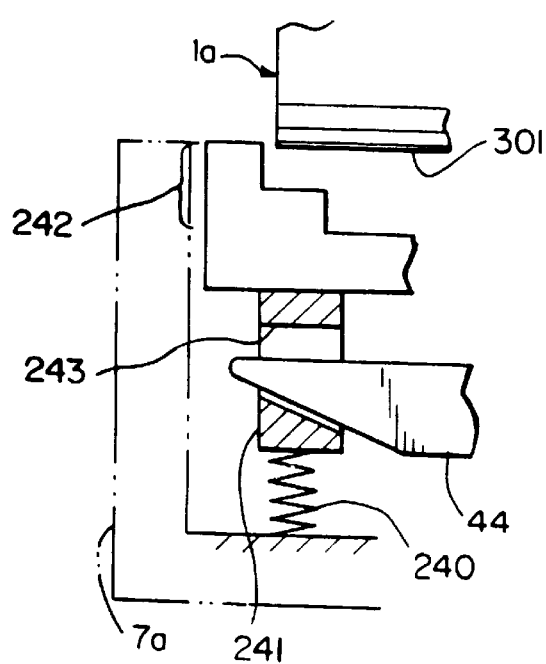
FIGS. 43A and 43B are fragmentary enlarged views of the mechanism shown in FIG. 41B.

When the knob 16 is engaged with the drive shaft 332, the spring seat 134 connected to the knob 116 in the thrust direction is located at its most rearward or deepest position in the apparatus body 314. Therefore, the portion 44a of the regulating member 44 is also located at its deepest position by being pressed by the flange 160 of the spring seat 134. In this condition, as shown in FIG. 43A, the other or rear end of the regulating member 44 is received in the hole 243, maintaining the bifurcated member 241 in its inoperative position. When the knob 116 is disengaged from the drive shaft 332, the spring seat 134 is moved toward the front of the apparatus body 314 together with the knob 116. As a result, the portion 44a of the regulating member 44 is moved forward by the flange 160 with its rear end moving out of the hole 243. When the knob 116 is fully disengaged from the drive shaft 332, the rear end of the member 44 is fully released from the hole 243. As a result, the bifurcated member 241 is raised by the spring 240 into contact with the drum 301. In the specific configuration shown in FIGS. 43A and 43B, the rear end of the member 44 and the inner periphery of the hole 243 are tapered in order to promote smooth engagement and disengagement.

Figure 43B:
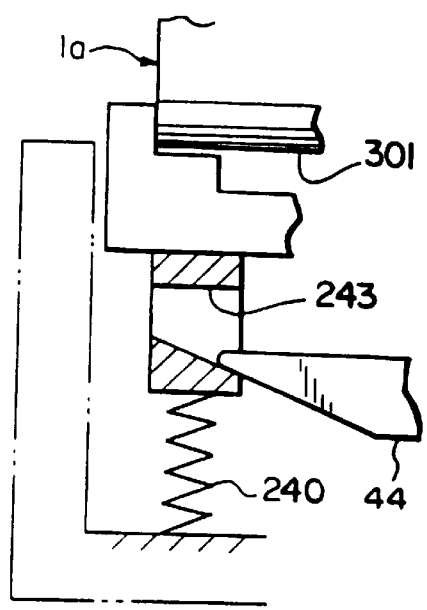

The interlocking mechanism shown in FIGS. 43A and 43B is similarly applicable to the mechanism of FIG. 41A which biases the drum 301 downward. Of course, such an interlocking mechanism is only illustrative and may be modified in various ways. The interlocking mechanism may also be applied to the front lug 322, if desired.

Figure 44A:
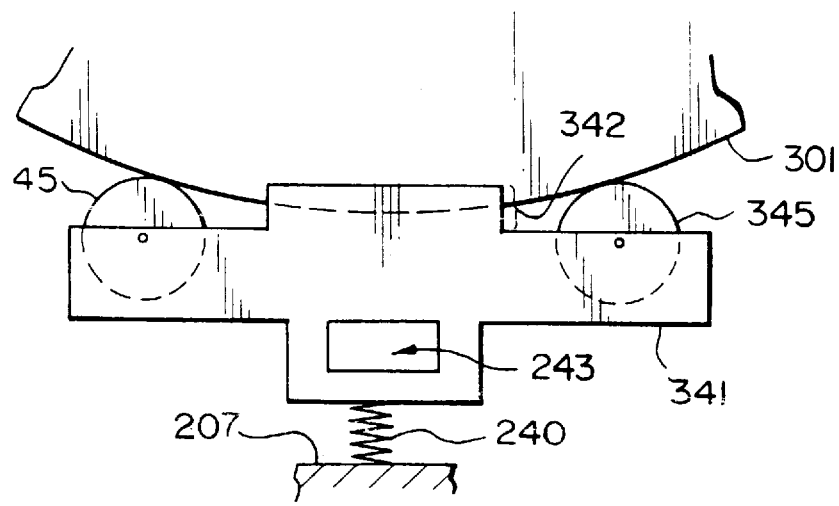
FIGS. 44A and 44B show another modification of the mechanism shown in FIGS. 40A and 40B.
Figure 44B:
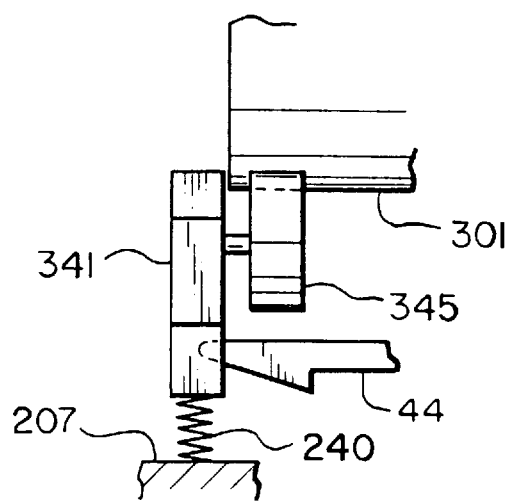

FIGS. 44A and 44B show another specific configuration of the interlocking mechanism. As shown, a flat member 341 includes a portion 342 corresponding to the shoulder 23a of the lug 323, and a pair of rollers 345 corresponding to the portions 42, FIG. 411B. The flat member 341 is biased upward by a spring 40. The rollers 345 play the role of the shoulder 23b of the lug 23. The member 341 is also formed with the hole 243 for receiving the regulating member 44. The member 341 may also replace the lug 322 or the arrangement shown in FIG. 41A.

In the illustrative embodiment, the guide rails 217 and 218 are mounted on the casing 207 of the image forming unit 102. Alternatively, the guide rails 217 and 218 and the casing 207 may be separable from each other. For example, a base may be mounted on the guide rails 217 and 218 and loaded with the casing 207, in which case the casing 207 will be positioned by a suitable positioning mechanism. This kind of arrangement allows the operator to pull out the image forming unit 102, pick up the casing 207 from the guide rails 217 and 218, and then replace the entire image forming unit 102.

As stated above, in this embodiment, the lugs are located at positions facing the opposite ends of the drum 301, but not interfering with the flanges. The lugs allow the drum 301 to be moved into and out of the apparatus body 314 together with the image forming unit 102. Therefore, even when a trouble occurs in the relatively heavy image forming unit 102, the unit 102 can be easily pulled out of the apparatus body 314. Because the drum 301 can be readily removed from the image forming unit 102 pulled out of the apparatus body 314, there can be promoted easy cleaning and troubleshooting of the portions other than the drum 301. This successfully reduces the down time of the apparatus.

The image forming unit 102 can be cleaned or otherwise dealt with only if it is pulled out of the apparatus body 314, i.e., while being supported by the guide rails. This reduces the floor area for cleaning and other work, and thereby reduces the total area to be allocated to the printer.

There may be provided a mechanism for pressing, when the drum 301 is moved together with the image forming unit 102, the shoulders 22b and 23b of the casing 207 and the periphery of the drum 301 against each other. This mechanism allows the shoulders 22a and 22b to surely hitch the drum 301 and move it together with the image forming unit 102. In addition, an interlocking mechanism may cancel the pressure acting on the drum 301 in interlocked relation to the operation of the knob 116. This automatically obviates undesirable friction between the drum 310 and the pressing mechanism and thereby extends the life of the structural parts.

In summary, it will be seen that the present invention provides an image forming apparatus having various unprecedented advantages, as enumerated below.

(1) The individual image forming unit can be accurately positioned relative to and supported by the apparatus body.

(2) Only desired one a plurality of image forming units can be dismounted independently of the others.

(3) The distance (pitch) between nearby image forming units is reduced, reducing the overall size of the apparatus.

(4) Support members can be produced with high accuracy, maintaining accuracy despite aging.

(5) Positioning means accurately positions an optical writing device together with the image forming unit with a minimum number of parts. In addition, slight dislocation can be minimized despite the mounting and dismounting of the image forming unit.

(6) In the case of a sheet jam or similar trouble, a sheet existing between the image forming unit and conveying means can be removed with ease.

(7) The image forming unit and conveying means can be positioned more accurately than in a conventional apparatus, enhancing image quality.

(8) An image produced by the apparatus is free from irregular density and misregister.

(9) A broad working space is available for the replacement of a shaft support member and drive transmission device.

(10) Rotary bodies included in the apparatus can be positioned accurately and easily.

(11) A developing liquid overflown the image forming unit is prevented from smearing the surrounding sections of the apparatus.

(12) The overflow of the developing liquid is reported to the operator, urging the operator to discharge the liquid.

(13) A cover covering the top of the image forming unit allows a minimum of liquid to deposit at its end portions. This, coupled with the fact that the overflown liquid is surely received in a channel, frees the surrounding sections from contamination.

(14) An image carrier is mounted and dismounted via a space where members interfering with a cleaning device are absent. This facilitates the mounting and dismounting of the image carrier.

Various modifications will become possible for those skilled in the art after receiving the teachings of the present disclosure without departing from the scope thereof.

What is claimed is:

1. An image forming apparatus comprising:
a body;
a plurality of image forming units each including a respective image carrier and being movable in an axial direction of said image carrier to be selectively mounted to or dismounted from said body, said plurality of image forming units being arranged linearly in a direction perpendicular to axes of image carriers thereof conveying means for conveying a recording medium linearly via said plurality of image forming units such that said recording medium sequentially passes through image transfer positions respectively facing said image carriers;

body side positioning means for positioning an end of the individual image forming unit opposite to an end to be operated for mounting and dismounting;

a plurality of support members for supporting said end of said individual image forming unit to be operated when said individual image forming unit is mounted to said body, said plurality of support members extending substantially parallel to a linear transport path for the recording medium, but outside of a mounting/dismounting path assigned to said individual image forming unit; and mounting/dismounting side positioning means for positioning said end of said individual image forming unit to be operated relative to said plurality of support members and for positioning an end of an optical writing device.

2. An apparatus as claimed in claim 1, wherein said plurality of support members comprise a single molding.

3. An apparatus as claimed in claim 1, wherein at least one of said plurality of support members has a tubular configuration.

4. An apparatus as claimed in claim 1, further comprising adjusting means for adjusting a position of said end of said individual image forming unit to be operated relative to said plurality of support members.

5. An apparatus as claimed in claim 1, wherein said optical writing device is provided independently of a body of said individual image forming unit, for scanning a uniformly charged surface of said image carrier with light in accordance with an image to thereby form a latent image, wherein said mounting/dismounting side positioning means includes positioning means for positioning an end of said optical writing device corresponding to said end of said individual image forming unit to be operated relative to a body of said individual image forming unit.

6. An apparatus as claimed in claim 5, further comprising adjusting means for adjusting a position of said end of said optical writing device relative to said body of said individual image forming unit.

7. An apparatus as claimed in claim 1, wherein said conveying means is rotatable about a body side opposite to a mounting/dismounting side where said individual image forming unit is mounted or dismounted.

8. An apparatus as claimed in claim 7, further comprising a plurality of positioning means for positioning an end of said conveying means on said mounting/dismounting side relative to said plurality of positioning means.

9. An apparatus as claimed in claim 8, wherein said conveying means comprises a conveyor belt for conveying the recording medium while electrostatically retaining the recording medium thereon, and a drive roller for driving said conveyor belt, and wherein said conveying means is positioned relative to said plurality of support members on an axis of said drive roller.

10. An apparatus as claimed in claim 8, wherein said mounting/dismounting side positioning means comprises portions to be engaged provided on said plurality of support members, and engaging portions provided on said individual image forming unit for engaging with said portions to be engaged, wherein said portions to be engaged bifunction as portions to be engaged provided on said conveying means for positioning said conveying means relative to said plurality of support members.

11. An apparatus as claimed in claim 8, further comprising a locking mechanism located outside of said plurality of support members for locking said end of said conveying means on said mounting/dismounting side.

12. An image forming apparatus comprising:

a body;

a plurality of image forming units each including a respective image carrier and being movable in an axial direction of said image carrier to be selectively mounted to or dismounted from said body, said plurality of image forming units being arranged linearly in a direction perpendicular to axes of image carriers thereof, a conveying device configured to convey a recording medium linearly via said plurality of image forming units such that said recording medium sequentially passes through image transfer positions respectively facing said image carriers;

a body side positioning device configured to position an end of the individual image forming unit opposite to an end to be operated for mounting and dismounting;

a plurality of support members configured to support said end of said individual image forming unit to be operated when said individual image forming unit is mounted to said body, said plurality of support members extending substantially parallel to a linear transport path for the recording medium, but outside of a mounting/dismounting path assigned to said individual image forming unit; and a mounting/dismounting side positioning device configured to position said end of said individual image forming unit to be operated relative to said plurality of support members and configured to position an end of an optical writing device.

13. An image forming apparatus comprising:

a body;

a plurality of image forming units each including a respective image carrier and being movable in an axial direction of said image carrier to be selectively mounted to or dismounted from said body, said plurality of image forming units being arranged linearly in a direction perpendicular to axes of image carriers thereof, conveying means for conveying a recording medium linearly via said plurality of image forming units such that said recording medium sequentially passes through image transfer positions respectively facing said image carriers, body side positioning means for positioning an end of the individual image forming unit opposite to an end to be operated for mounting and dismounting;

a plurality of support members for supporting said end of said individual image forming unit to be operated when said individual image forming unit is mounted to said body, said plurality of support members extending substantially parallel to a linear transport path for the recording medium, but outside of a mounting/dismounting path assigned to said individual image forming unit, at least one of said plurality of support members having a tubular configuration; and mounting/dismounting side positioning means for positioning said end of said individual image forming unit to be operated relative to said plurality of support members.

* * * * *